(12) United States Patent
Word

(10) Patent No.: US 10,686,905 B1
(45) Date of Patent: Jun. 16, 2020

(54) NETWORK-AWARE CACHING

(71) Applicant: Amazon Technologies, Inc., Reno, NV (US)

(72) Inventor: Jonathan Brian Word, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 577 days.

(21) Appl. No.: 14/482,647

(22) Filed: Sep. 10, 2014

(51) Int. Cl.
*H04L 29/08* (2006.01)
*H04L 13/08* (2006.01)

(52) U.S. Cl.
CPC ...... *H04L 67/2842* (2013.01); *H04L 67/1097* (2013.01)

(58) Field of Classification Search
CPC ............ H04L 67/2842; H04L 67/1097; G06F 12/122; G06F 12/0888; G06F 12/0868; G06F 3/0685; G06F 3/061; G06F 3/0631; G06F 12/0871; G06F 12/0897; G06F 2212/604
See application file for complete search history.

(56) References Cited

U.S. PATENT DOCUMENTS

| 7,441,012 | B2 | 10/2008 | Palevich et al. |
| 7,904,435 | B2 | 3/2011 | Goyal et al. |
| 8,296,599 | B1 | 10/2012 | Boyer et al. |
| 61,944,722 | * | 2/2014 | Khadiwala et al. |
| 8,935,493 | B1 * | 1/2015 | Dolan ................... G06F 3/0649 711/117 |
| 2005/0138110 | A1 * | 6/2005 | Redlich ............ C07K 14/70575 709/201 |
| 2008/0168152 | A1 * | 7/2008 | Weizman .......... G06F 17/30126 709/213 |
| 2011/0126060 | A1 * | 5/2011 | Grube ................. G06F 11/1088 714/48 |
| 2011/0252100 | A1 * | 10/2011 | Raciborski ........ G06F 17/30194 709/206 |
| 2012/0066337 | A1 * | 3/2012 | Wu ....................... G06F 3/0605 709/214 |
| 2013/0117337 | A1 | 5/2013 | Dunham |
| 2014/0136571 | A1 * | 5/2014 | Bonvin ............. G06F 17/30318 707/792 |

(Continued)

OTHER PUBLICATIONS

U.S. Appl. No. 13/968,148, filed Aug. 15, 2014, Jonathan Brian Word.

*Primary Examiner* — Soe Hlaing
(74) *Attorney, Agent, or Firm* — Robert C. Kowert; Kowert, Hood, Munyon, Rankin & Goetzel, P.C.

(57) ABSTRACT

Methods and systems for implementing network-aware caching are disclosed. Respective performance characteristics are determined for accessing a plurality of storage locations from a client computing device. The storage locations comprise one or more shared network-access storage locations accessible to the client computing device over a network and optionally one or more dedicated storage locations of the client computing device. One of the storage locations is selected for storing data to which access is requested by the client computing device. The selected storage location is determined based on the respective performance characteristics of the storage locations. The data is cached in the selected storage location.

20 Claims, 22 Drawing Sheets

(56) References Cited

U.S. PATENT DOCUMENTS

2014/0136782 A1\* 5/2014 Thomas ............ G06F 17/30115
                                                711/117
2015/0039837 A1\* 2/2015 Quan ...................... G06F 3/061
                                                711/136

\* cited by examiner

NETWORK-AWARE CACHING

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

As the technological capacity for organizations to create, track, and retain information continues to grow, a variety of different technologies for managing and storing information have been developed. Distributed storage systems, for example, provide clients with many different configurations of hardware and software to manage stored information. However, the increasing amounts of data that organizations must store and manage often correspondingly increase both the size and complexity of data storage and management technologies, which in turn escalate the cost of maintaining the information. New technologies seek to reduce both the complexity and storage requirements of maintaining data while simultaneously improving the efficiency of data storage and data management.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing network-aware caching are described. A distributed system may include one or more clients and one or more shared network-access storage resources. The shared network-access storage resource(s) are accessible to the client(s) over a network. When access to a chunk of data is requested by a client, a network-aware caching service may determine a storage location in which to store the requested chunk. The network-aware caching service may select the storage location from a set of potential storage locations including one or more dedicated storage resources on the client and one or more of the shared network-access storage resources. The storage location may be selected based on one or more performance characteristics related to accessing the storage location from the client. For example, the storage location may be selected to optimize for latency, throughput, bandwidth, available storage, cost, reliability, durability, and/or security. Using these techniques, read and/or write access to data throughout a network may be provided to clients in an optimized manner.

Figure 1:
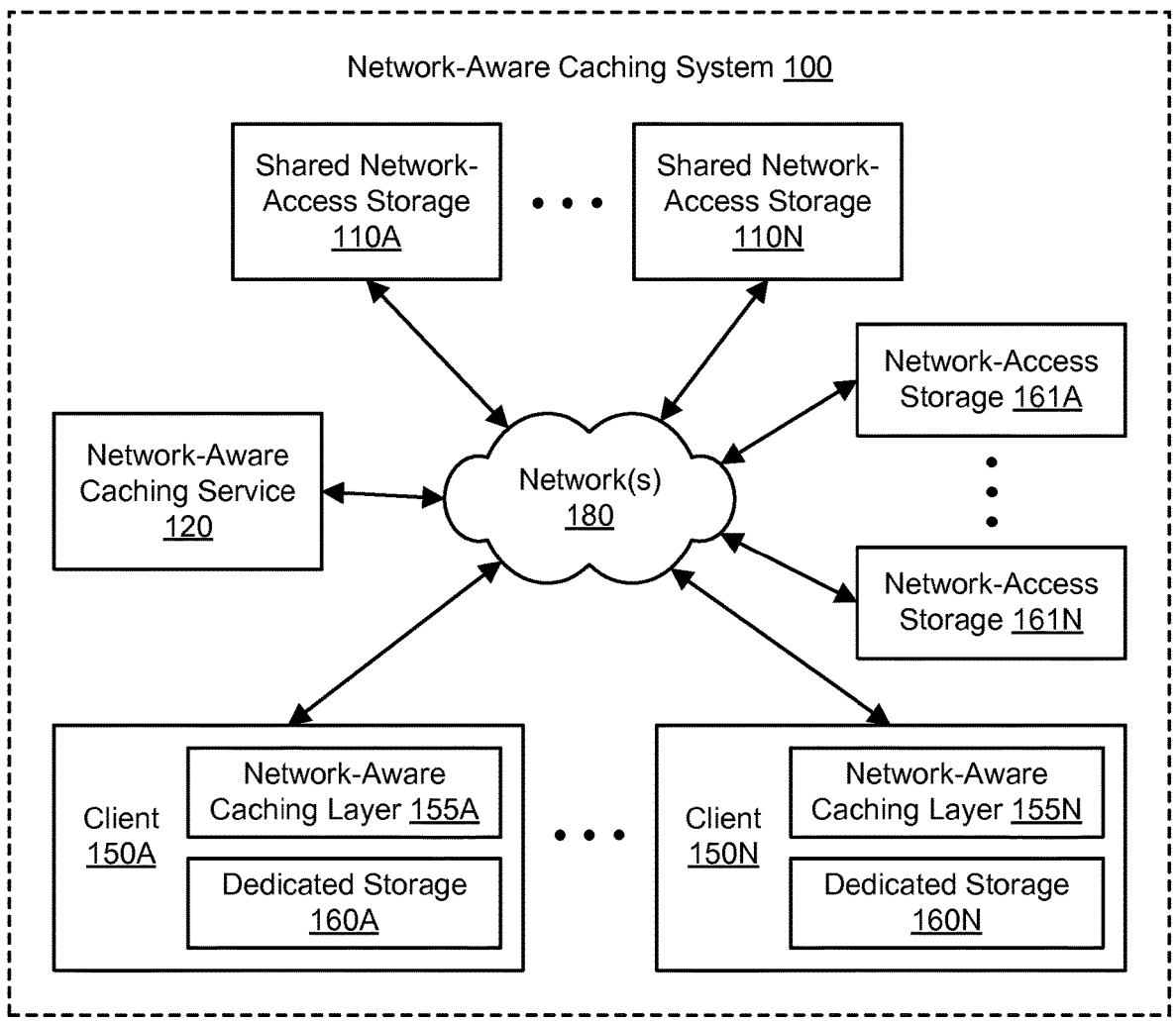
FIG. 1 illustrates an example system environment for network-aware caching, according to one embodiment.

FIG. 1 illustrates an example system environment for network-aware caching, according to one embodiment. The example system environment may implement a network-aware caching system 100. The network-aware caching system 100 may include components such as a plurality of shared network-access storage resources 110A-110N, a plurality of client computing devices 150A-150N, and a network-aware caching service 120. The various components of the network-aware caching system 100 may be coupled via one or more networks 180. Although two shared network-access storage resources 110A and 110N are shown for purposes of illustration, it is contemplated that different numbers and/or configurations of shared network-access storage resources may be used with the network-aware caching system 100. Although two clients 150A and 150N are shown for purposes of illustration, it is contemplated that different numbers and/or configurations of clients may be used with the network-aware caching system 100.

The shared network-access storage resources 110A-110N may be accessible to a plurality of the clients 150A-150N over the network(s) 180. Multiple ones of the clients 150A-150N may read data from and/or write data to the shared network-access storage resources 110A-110N. The shared network-access storage resources 110A-110N may typically include persistent storage resources such as hard-drive-based storage, tape-based storage, and other suitable types of data stores. The shared network-access storage resources 110A-110N may be managed by other computing devices such that read access and/or write access to the shared network-access storage resources 110A-110N may be controlled by the other computing devices.

Figure 14:
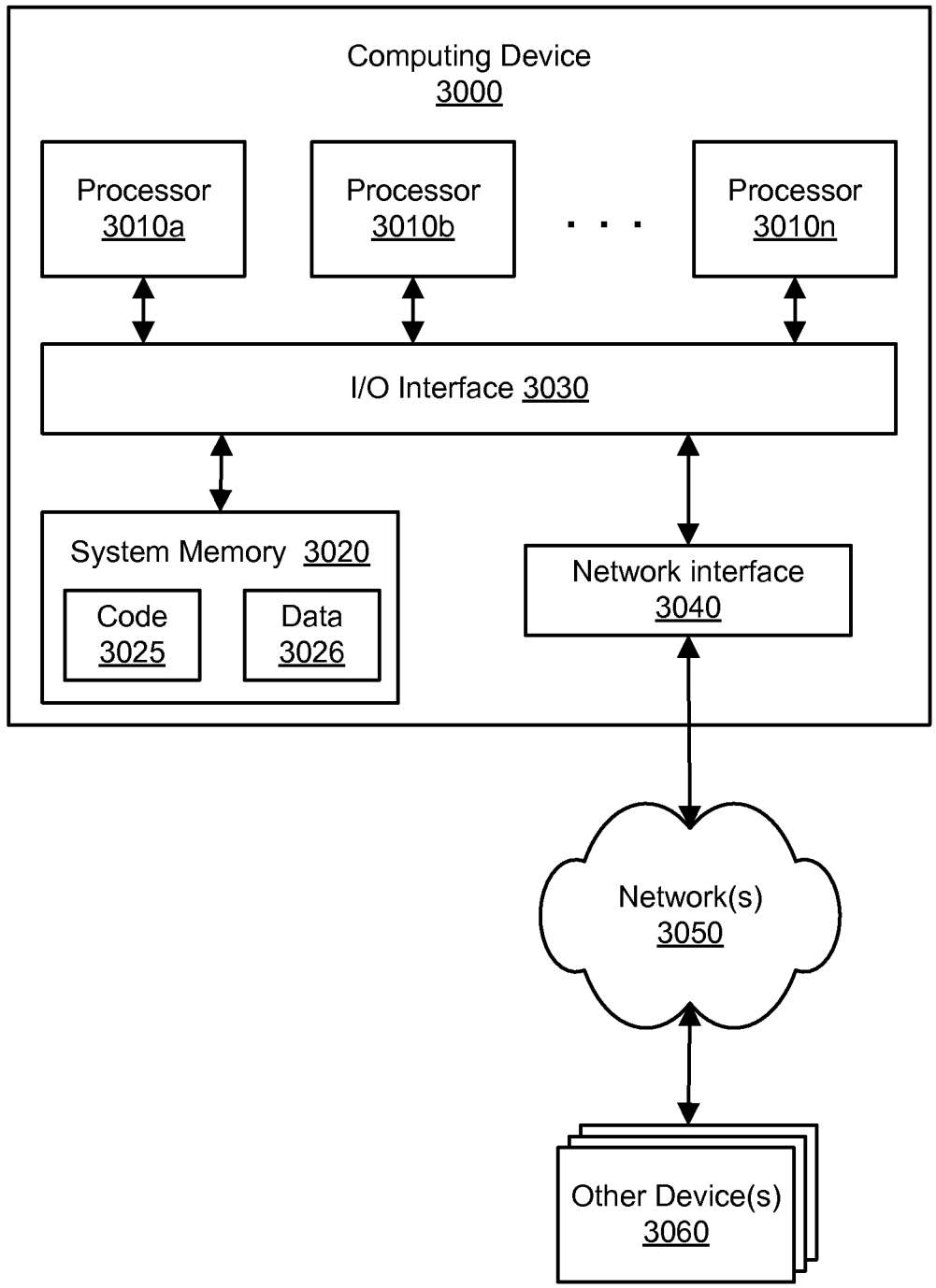
FIG. 14 illustrates an example of a computing device that may be used in some embodiments.

Each of the shared network-access storage resources 110A-110N may be implemented using one or more computing devices, any of which may be implemented by the example computing device 3000 illustrated in FIG. 14. The network-aware caching service 120 may also be implemented using one or more computing devices, any of which may be implemented by the example computing device 3000 illustrated in FIG. 14. Similarly, each of the clients 150A-150N may be implemented using one or more computing devices, any of which may be implemented by the example computing device 3000 illustrated in FIG. 14.

In one embodiment, each of the clients 150A-150N may include dedicated storage resources, such as dedicated storage resources 160A for client 150A and dedicated storage resources 160N for client 150N. At any particular client, the dedicated storage resources may include one or more storage devices or storage subsystems that are managed by the client or otherwise accessible to the client without accessing the network(s) 180, e.g., accessible over a local bus or interconnection and without necessarily using a network interface. For example, the dedicated storage resources 160A-160N may include CPU cache resources, RAM resources, one or more hard drives, one or more flash drives, and/or other suitable memory resources or storage devices.

In one embodiment, the network-aware caching system 100 may also include a plurality of network-access storage resources 161A-161N. Although two network-access storage resources 161A and 161N are shown for purposes of illustration, it is contemplated that different numbers and/or configurations of network-access storage resources may be used with the network-aware caching system 100. Each of network-access storage resources 161A-161N may be accessible to a particular one of the clients 150A-150N for reading data and/or writing data. For example, the client 150A may have exclusive access (based on a current configuration) to the network-access storage resources 161A, and the client 150N may have exclusive access (based on a current configuration) to the network-access storage resources 161N. Accordingly, the network-access storage resources 161A-161N may also represent dedicated storage for particular clients. Each of the network-access storage resources 161A-161N may be accessible to the corresponding one of the clients 150A-150N over the network(s) 180. The network-access storage resources 161A-161N may typically include persistent storage resources such as hard-drive-based storage, tape-based storage, and other suitable types of data stores.

Each of the shared network-access storage resources 110A-110N, dedicated storage resources 160A-160N, and network-access storage resources 161A-161N may have individual performance characteristics for access (e.g., read and/or write access) by a particular client. For example, the performance characteristics of the various storage resources may relate to latency (e.g., the time between the request to the network-aware caching layer and the first byte of data returned to the caller), throughput (e.g., the average number of bytes per second), size (e.g., the available amount of storage), cost, reliability (e.g., the probability that the data will be available when requested), durability (e.g., the probability that the data will not be corrupted over time), and/or security (e.g., the probability that access to the data will be properly restricted).

In one embodiment, each of the clients 150A-150N may include a network-aware caching layer, such as network-aware caching layer 155A for client 150A and network-aware caching layer 155N for client 150N. The network-aware caching layers 155A-155N may be implemented using any suitable software, hardware, or a combination thereof. The network-aware caching service 120 may also be implemented using any suitable software, hardware, or a combination thereof. Using appropriate components of the network-aware caching system 100, such as the network-aware caching service 120 and/or network-aware caching layers 155A-155N, access to data may be provided to individual clients in a manner that optimizes performance. After determining performance characteristics of various shared network-access storage resources 110A-110N, dedicated storage resources, and/or network-access storage resources 161A-161N for a particular client, the network-aware caching service 120 and/or network-aware caching layer for the particular client may select one or more of the storage resources to store one or more chunks or other sets of data to which the client has requested access. The selected storage resources may be chosen based on their performance characteristics to optimize along one or more dimensions, such as latency, throughput, cost, reliability, durability, and/or security. As used herein, the term "optimize" generally means "improve" or "enhance" rather than necessarily "make optimal." Optimizing for one or more of the characteristics may include providing a selected level of performance. In one embodiment, the network-aware caching service 120 may be used to configure aspects of the network-aware caching system 100. In one embodiment, the network-aware caching service 120 may be used to implement data transfers from one storage resource to another storage resource.

In one embodiment, one or more of the shared network-access storage resources 110A-110N and/or network-access storage resources 161A-161N may provide the functionality of a network-backed file system to any of the clients 150A-150N. To implement the network-backed file system, any of the shared network-access storage resources 110A-110N and/or network-access storage resources 161A-161N may store and maintain a hierarchical file system 1110 for use with a file system subscription management service. Accordingly, the network-backed file system may be used in combination with the network-aware caching system 100. The network-backed file system is discussed in greater detail below with respect to FIG. 6 through FIG. 13.

Figure 2A:
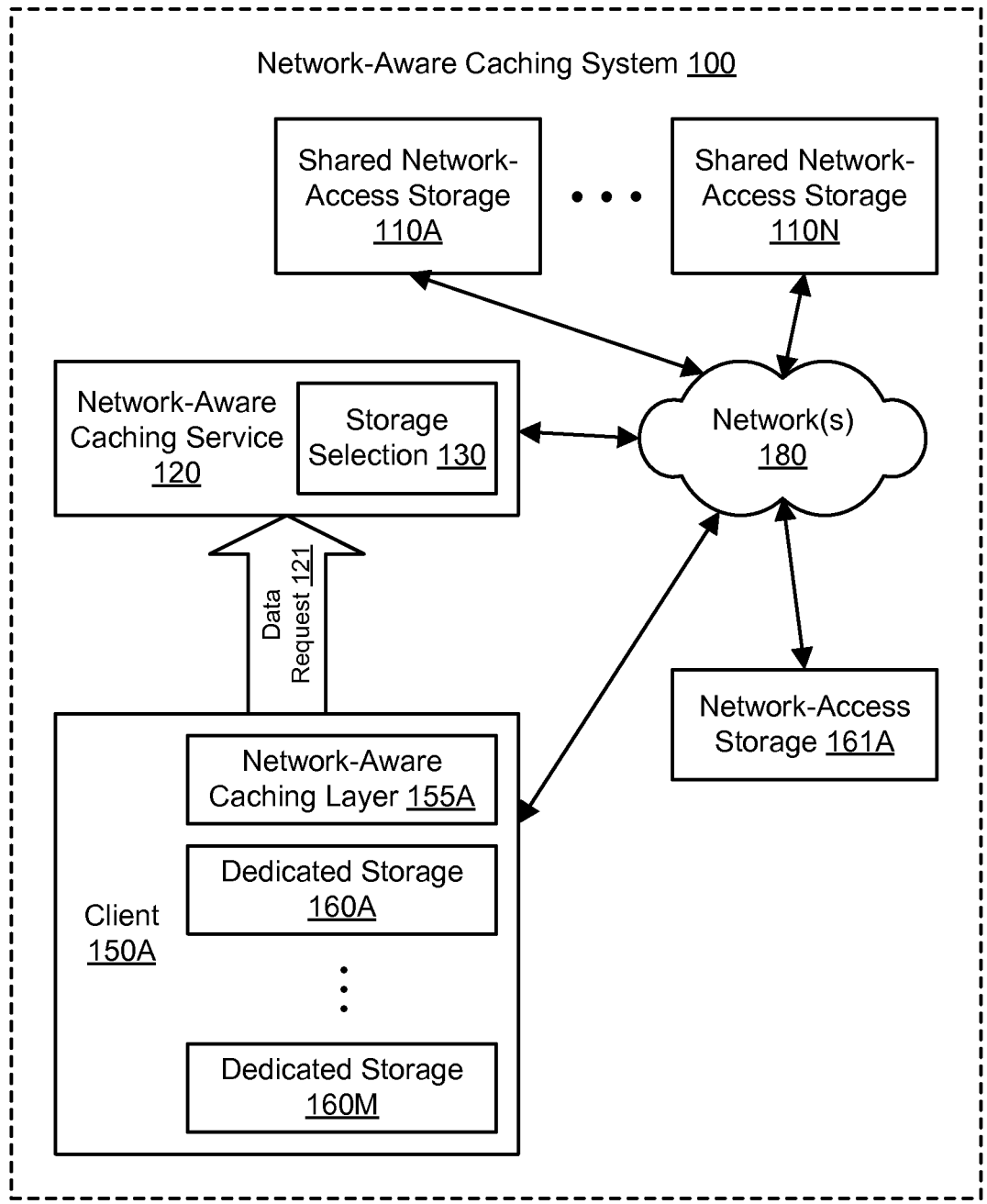
FIG. 2A illustrates further aspects of the example system environment for network-aware caching, including a network-aware caching service configured to process a data request, according to one embodiment.

FIG. 2A illustrates further aspects of the example system environment for network-aware caching, including a network-aware caching service configured to process a data request, according to one embodiment. In one embodiment, access to data by one or more clients may be mediated using the network-aware caching service 120 to enhance the latency, throughput, cost, reliability, durability, and/or security of the access. In the example illustrated in FIG. 2A, a client 150A may seek access to a particular chunk of data or other set of data. Accordingly, a component of the client 150A, such as a component of the operating system, may issue a data request 121 to seek access to the data. In one embodiment, the network-aware caching layer 155A may emulate a storage device such as RAM or a hard disk, and the operating system on the client 150A may send the data request 121 to the network-aware caching layer 155A as if it were a logical storage device. The network-aware caching layer 155A may then send the data request 121 to the network-aware caching service 120. The data request 121 may identify the data to which access is sought using any suitable technique(s).

The network-aware caching service 120 may include a storage selection functionality 130. The storage selection functionality 130 may reference any suitable metrics or configuration values to characterize the differing performance characteristics of the various shared network-access storage resources 110A that are accessible to the requesting client 150A over the network(s) 180. The storage selection functionality 130 may also reference any suitable metrics or configuration values to characterize the differing performance characteristics of the various dedicated storage resources 160A-160M of the requesting client 150A. In one embodiment, the storage selection functionality 130 may also reference any suitable metrics or configuration values to characterize the differing performance characteristics of any network-access storage resources 161A that are accessible to the requesting client 150A over the network(s) 180. The determination of the performance characteristics is discussed in greater detail below with respect to FIG. 4.

In one embodiment, the storage selection functionality 130 may monitor (or have access to data resulting from monitoring) access patterns for a particular user and/or client device. As used herein, the term "user access pattern" may include data indicating how much data has been accessed, what data has been accessed, and/or when the data has been accessed by a particular user and/or client device. For example, a user access pattern may indicate that a particular set of data has not been accessed by a user since a particular date. The frequency at which a user has accessed a particular set of data, as indicated by a user access pattern, may be part of the selection made by the storage selection functionality 130. Accordingly, the storage selection functionality 130 may attempt to match a user access pattern with a particular storage location, e.g., to cache data requested by the user.

Using the storage selection functionality 130, the network-aware caching service 120 may select a storage resource on which to store the requested data for subsequent access by the requesting client 150A. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. Each of the shared network-access storage resources 110A-110N, dedicated storage resources 160A-160M, and/or network-access storage resources 161A that are accessible to the requesting client 150A may generally be referred to as storage locations. The selected storage location(s) may be chosen to enhance the latency, throughput, cost, reliability, durability, and/or security of the access. As will be discussed in greater detail below with respect to FIGS. 2B and 2C, the network-aware caching service 120 may cause the requested data to be copied to the selected storage location for optimized access by the client 150A. In one embodiment, access to the copy of the data may then be mediated by the network-aware caching layer 155A, e.g., by the caching layer 155A emulating a logical storage device to respond to read and/or write requests from the operating system of the client 150A. In one embodiment, different chunks or other subsets of data from a particular file or set of files may be stored on different storage resources using the network-aware caching techniques described herein.

Figure 2B:
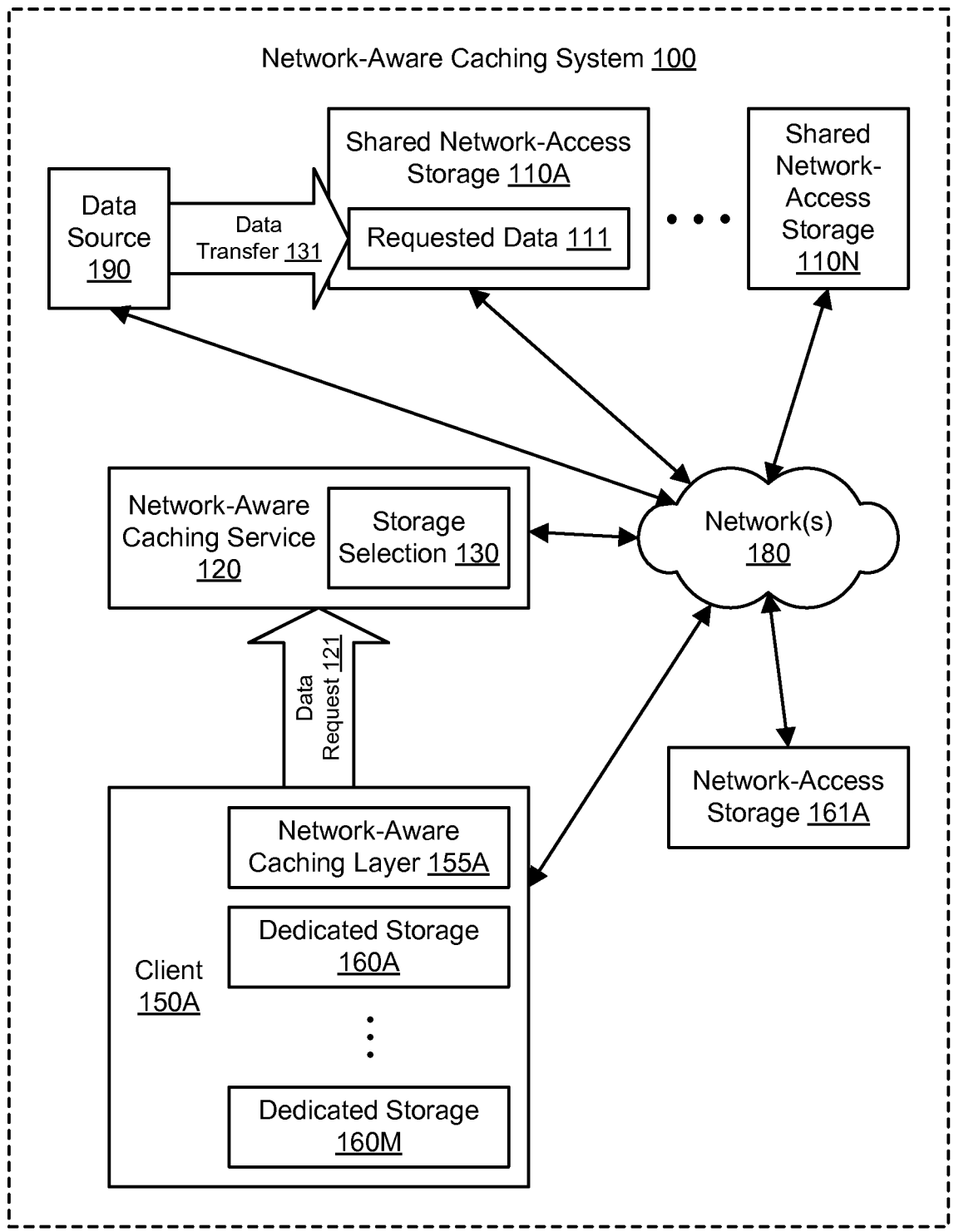
FIG. 2B illustrates further aspects of the example system environment for network-aware caching, including a network-aware caching service selecting a shared network-access storage location for storing requested data, according to one embodiment.

FIG. 2B illustrates further aspects of the example system environment for network-aware caching, including a network-aware caching service selecting a shared network-access storage location for storing requested data, according to one embodiment. As discussed above, a client 150A may seek access to a particular chunk of data or other set of data. Accordingly, a component of the client 150A, such as a component of the operating system, may issue a data request 121 to seek access to the data. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the requesting client 150A.

In the example illustrated in FIG. 2B, the storage selection functionality 130 may select one of the shared network-access storage resources, such as shared network-access storage resource 110A. The selected storage location 110A may be chosen to enhance the latency, throughput, cost, reliability, durability, and/or security of the access. For example, the shared network-access storage resource 110A may be chosen over any of the dedicated storage resources 160A-160M or network-access storage resources 161A because it is expected to provide data access with superior reliability, durability, and/or security with acceptable levels of latency and throughput. As another example, the shared network-access storage resource 110A may be chosen over any of the dedicated storage resources 160A-160M, network-access storage resources 161A, and other shared network-access storage resources because it is expected to provide the lowest-cost access with acceptable levels of latency, throughput, reliability, durability, and/or security. In some network environments, data transfer between one or more shared network-access storage resources and a client may be sufficiently fast that much of the data requested by the client may be cached on the shared network-access storage locations using the network-aware caching system 100.

As indicated by the data transfer request 131 shown in FIG. 2B, the network-aware caching service 120 may cause the requested data 111 to be copied from a data source 190 to the selected storage location 110A for optimized access by the client 150A. The data source 190 may represent any suitable storage location in the network-aware caching system 100, including one of the shared network-access storage devices 110A-110N, one of the network-access storage devices 161A-161N, or dedicated storage 160A-160N. The requested data 111 may be pushed or pulled to the selected storage location, and the requested data 111 may be transferred to the selected storage location with or without the network-aware caching service 120 as an intermediary. In one embodiment, access to the copy of the data 111 may then be mediated by the network-aware caching layer 155A, e.g., by the caching layer 155A emulating a logical storage device to respond to read and/or write requests involving the data 111 from the operating system of the client 150A. Access by the client 150A to the requested data 111 may involve the use of a network access interface (e.g., network card) of the client 150A, e.g., to transfer elements of the requested data 111 from the shared network-access storage 110A to the client 150A over the network(s) 180 or to transfer modifications to the requested data 111 from the client 150A to the shared network-access storage 110A over the network(s) 180.

Figure 2C:
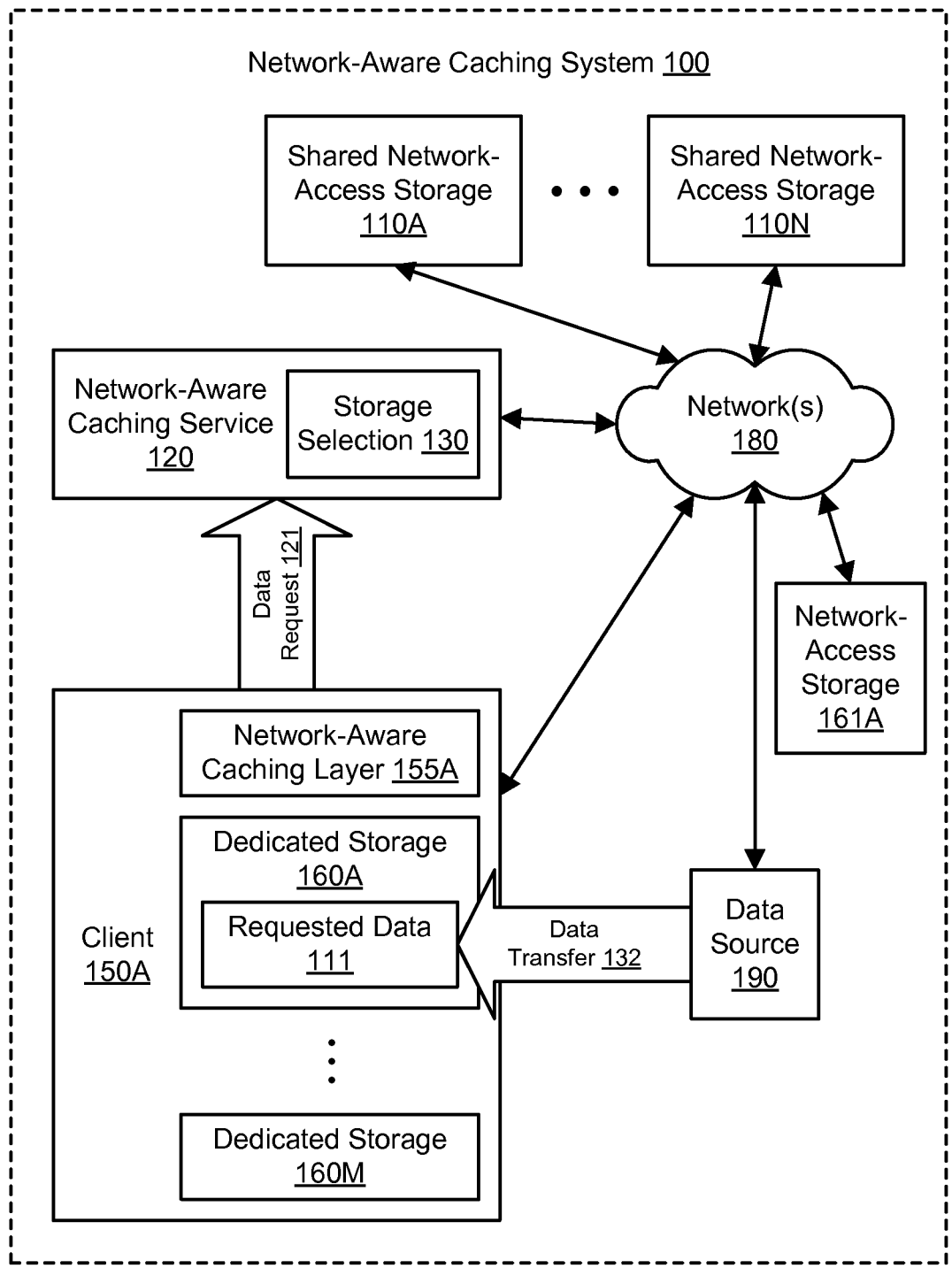
FIG. 2C illustrates further aspects of the example system environment for network-aware caching, including a network-aware caching service selecting a dedicated storage location for storing requested data, according to one embodiment.

FIG. 2C illustrates further aspects of the example system environment for network-aware caching, including a network-aware caching service selecting a dedicated storage location for storing requested data, according to one embodiment. As discussed above, a client 150A may seek access to a particular chunk of data or other set of data. Accordingly, a component of the client 150A, such as a component of the operating system, may issue a data request 121 to seek access to the data. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the requesting client 150A.

In the example illustrated in FIG. 2C, the storage selection functionality 130 may select one of the dedicated storage resources, such as dedicated storage resource 160A. The selected storage location 160A may be chosen to enhance the latency, throughput, cost, reliability, durability, and/or security of the access. For example, the dedicated storage resource 160A may be chosen over any of the shared network-access storage resources 110A-110N or network-access storage resources 161A because it is expected to provide data access with superior latency and throughput with acceptable levels of reliability, durability, and/or security. As another example, the dedicated storage resource 160A may be chosen over any of the shared network-access storage resources 110A-110N, network-access storage resources 161A, and other dedicated storage resources because it is expected to provide the lowest-cost access with acceptable levels of latency, reliability, durability, and/or security.

As indicated by the data transfer request 132 shown in FIG. 2C, the network-aware caching service 120 may cause the requested data 111 to be copied from a data source 190 to the selected storage location 160A for optimized access by the client 150A. The data source 190 may represent any suitable storage location in the network-aware caching system 100, including one of the shared network-access storage devices 110A-110N, one of the network-access storage devices 161A-161N, or dedicated storage 160A-160N. The requested data 111 may be pushed or pulled to the selected storage location, and the requested data 111 may be transferred to the selected storage location with or without the network-aware caching service 120 as an intermediary. In one embodiment, access to the copy of the data 111 may then be mediated by the network-aware caching layer 155A, e.g., by the caching layer 155A emulating a logical storage device to respond to read and/or write requests involving the data 111 from the operating system of the client 150A. Access by the client 150A to the requested data 111 may avoid the use of a network access interface (e.g., network card) of the client 150A.

Figure 2D:
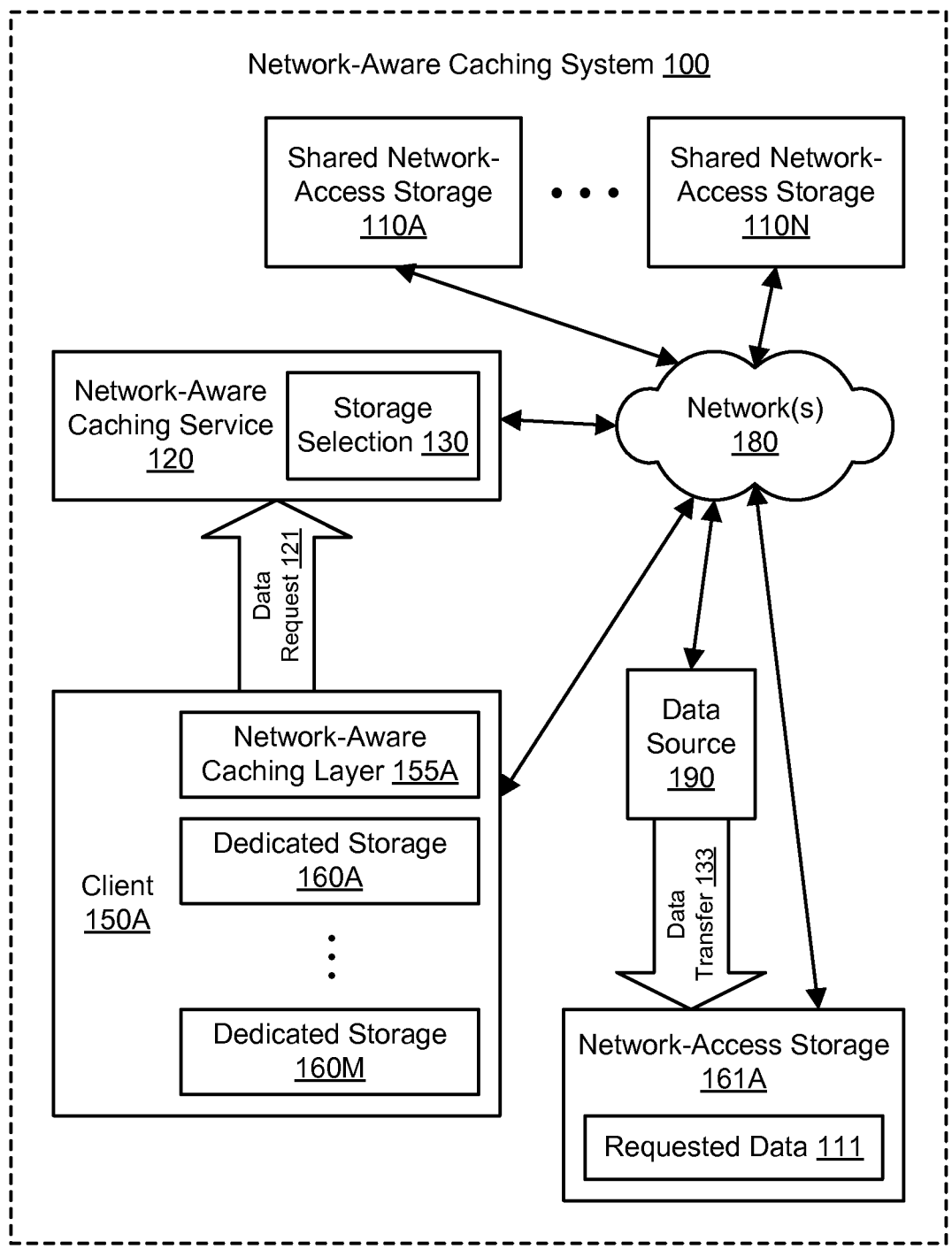
FIG. 2D illustrates further aspects of the example system environment for network-aware caching, including a network-aware caching service selecting a network-access storage location for storing requested data, according to one embodiment.

FIG. 2D illustrates further aspects of the example system environment for network-aware caching, including a network-aware caching service selecting a network-access storage location for storing requested data, according to one embodiment. As discussed above, a client 150A may seek access to a particular chunk of data or other set of data. Accordingly, a component of the client 150A, such as a component of the operating system, may issue a data request 121 to seek access to the data. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the requesting client 150A.

In the example illustrated in FIG. 2D, the storage selection functionality 130 may select one of the network-access storage resources 161A. The selected storage location 161A may be chosen to enhance the latency, throughput, cost, reliability, durability, and/or security of the access. For example, the network-access storage resource 161A may be chosen over any of the dedicated storage resources 160A-160M or shared network-access storage resources 110A-110N because it is expected to provide data access with superior reliability, durability, and/or security with acceptable levels of latency and throughput. As another example, the network-access storage resource 161A may be chosen over any of the dedicated storage resources 160A-160M and shared network-access storage resources 110A-110N because it is expected to provide the lowest-cost access with acceptable levels of latency, throughput, reliability, durability, and/or security. In some network environments, data transfer between one or more network-access storage resources and a client may be sufficiently fast that much of the data requested by the client may be cached on the network-access storage locations using the network-aware caching system 100.

As indicated by the data transfer request 133 shown in FIG. 2D, the network-aware caching service 120 may cause the requested data 111 to be copied from a data source 190 to the selected storage location 161A for optimized access by the client 150A. The data source 190 may represent any suitable storage location in the network-aware caching system 100, including one of the shared network-access storage devices 110A-110N, one of the network-access storage devices 161A-161N, or dedicated storage 160A-160N. The requested data 111 may be pushed or pulled to the selected storage location, and the requested data 111 may be transferred to the selected storage location with or without the network-aware caching service 120 as an intermediary. In one embodiment, access to the copy of the data 111 may then be mediated by the network-aware caching layer 155A, e.g., by the caching layer 155A emulating a logical storage device to respond to read and/or write requests involving the data 111 from the operating system of the client 150A. Access by the client 150A to the requested data 111 may involve the use of a network access interface (e.g., network card) of the client 150A, e.g., to transfer elements of the requested data 111 from the network-access storage 161A to the client 150A over the network(s) 180 or to transfer modifications to the requested data 111 from the client 150A to the network-access storage 161A over the network(s) 180.

Figure 2E:
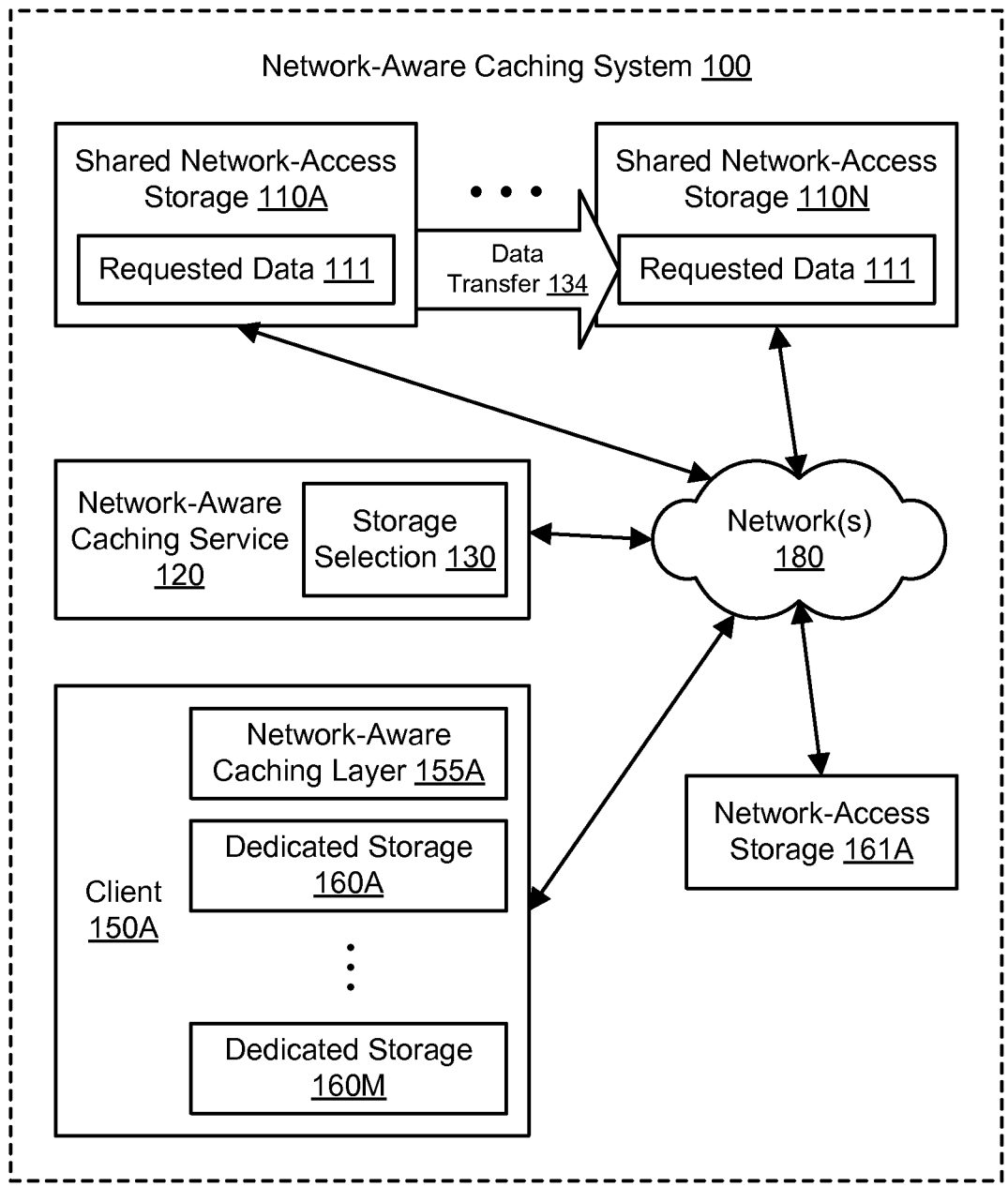
FIG. 2E illustrates further aspects of the example system environment for network-aware caching, including a network-aware caching service selecting a new storage location for previously cached data, according to one embodiment.

FIG. 2E illustrates further aspects of the example system environment for network-aware caching, including a network-aware caching service selecting a new storage location for previously cached data, according to one embodiment. In one embodiment, the storage selection functionality 130 may reassess the performance characteristics of various storage locations, e.g., to respond to changing conditions or changing configurations in the network-aware caching system 100. In one embodiment, the storage selection functionality 130 may reassess user access patterns to various storage locations and/or sets of data, e.g., to determine whether the storage locations and/or sets of data are more frequently accessed or less frequently accessed over time. The performance characteristics and/or user access patterns may be reassessed at any suitable time and for any suitable number of times.

In one embodiment, the storage selection functionality 130 may modify the location of previously cached data based on the reassessment of performance characteristics and/or user access patterns. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the previously cached data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the client 150A.

In the example illustrated in FIG. 2E, the data was previously cached in shared network-access storage 110A, and the storage selection functionality 130 may select another one of the storage resources, such as shared network-access storage resource 110N. However, it is contemplated that the previously cached data may be transferred from substantially any storage location to any other storage location in the network-aware caching system 100. The selected storage location 110N may be chosen to enhance the latency, throughput, cost, reliability, durability, and/or security of the access.

As indicated by the data transfer request 134 shown in FIG. 2E, the network-aware caching service 120 may cause the requested data 111 to be copied from the previously selected storage location 110A to the newly selected storage location 110N for optimized access by the client 150A. The data 111 may also be deleted from the previously selected storage location 110A. In one embodiment, access to the copy of the data 111 may then be mediated by the network-aware caching layer 155A, e.g., by the caching layer 155A emulating a logical storage device to respond to read and/or write requests involving the data 111 from the operating system of the client 150A. Access by the client 150A to the requested data 111 may involve the use of a network access interface (e.g., network card) of the client 150A, e.g., to transfer elements of the requested data 111 from the shared network-access storage 110N to the client 150A over the network(s) 180 or to transfer modifications to the requested data 111 from the client 150A to the shared network-access storage 110N over the network(s) 180.

Figure 3A:
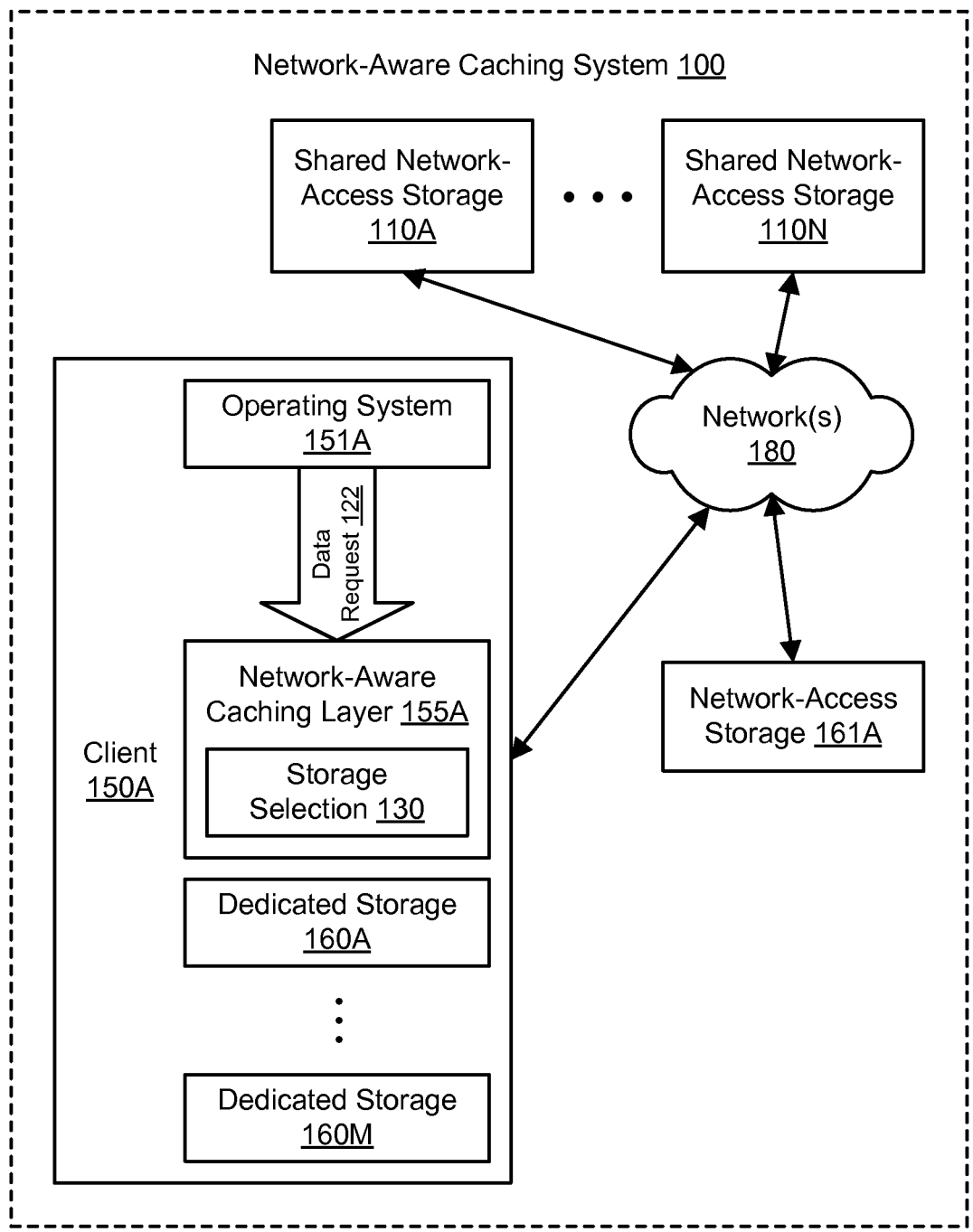
FIG. 3A illustrates further aspects of the example system environment for network-aware caching, including a network-aware caching layer configured to process a data request, according to one embodiment.

FIG. 3A illustrates further aspects of the example system environment for network-aware caching, including a network-aware caching layer configured to process a data request, according to one embodiment. In one embodiment, a network-aware caching layer on a client may implement aspects of the network-access caching service 120 as discussed above, e.g., with respect to FIG. 2A-2C. Accordingly, access to data by a client 155A may be mediated using a network-aware caching layer 155A to enhance the latency, throughput, cost, reliability, durability, and/or security of the access. In the example illustrated in FIG. 3A, a client 150A may seek access to a particular chunk of data or other set of data. Accordingly, a component of the client 150A, such as a component of the operating system 151A, may issue a data request 122 to seek access to the data. In one embodiment, the network-aware caching layer 155A may emulate a storage device such as RAM or a hard disk, and the operating system 151A on the client 150A may send the data request 122 to the network-aware caching layer 155A as if it were a logical storage device. The data request 122 may identify the data to which access is sought using any suitable technique(s).

The network-aware caching layer 155A may include a storage selection functionality 130. The storage selection functionality 130 may reference any suitable metrics or configuration values to characterize the differing performance characteristics of the various shared network-access storage resources 110A that are accessible to the requesting client 150A over the network(s) 180. The storage selection functionality 130 may also reference any suitable metrics or configuration values to characterize the differing performance characteristics of the various dedicated storage resources 160A-160M of the requesting client 150A. In one embodiment, the storage selection functionality 130 may also reference any suitable metrics or configuration values to characterize the differing performance characteristics of any network-access storage resources 161A that are accessible to the requesting client 150A over the network(s) 180. The determination of the performance characteristics is discussed in greater detail below with respect to FIG. 4.

In one embodiment, the storage selection functionality 130 may monitor (or have access to data resulting from monitoring) access patterns for a particular user and/or client device. As used herein, the term "user access pattern" may include data indicating what data has been accessed and when the data has been accessed by a particular user and/or client device. For example, a user access pattern may indicate that a particular set of data has not been accessed by a user since a particular date. The frequency at which a user has accessed a particular set of data, as indicated by a user access pattern, may be part of the selection made by the storage selection functionality 130. Accordingly, the storage selection functionality 130 may attempt to match a user access pattern with a particular storage location, e.g., to cache data requested by the user.

Using the storage selection functionality 130, the network-aware caching layer 155A may select a storage resource on which to store the requested data for subsequent access by the requesting client 150A. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. Each of the shared network-access storage resources 110A-110N, dedicated storage resources 160A-160M, and/or network-access storage resources 161A that are accessible to the requesting client 150A may generally be referred to as storage locations. The selected storage location(s) may be chosen to enhance the latency, throughput, cost, reliability, durability, and/or security of the access. As will be discussed in greater detail below with respect to FIGS. 3B and 3C, the network-aware caching layer 155A may cause the requested data to be copied to the selected storage location for optimized access by the client 150A. In one embodiment, access to the copy of the data may then be mediated by the network-aware caching layer 155A, e.g., by the caching layer 155A emulating a logical storage device to respond to read and/or write requests from the operating system 151A of the client 150A. In one embodiment, different chunks or other subsets of data from a particular file or set of files may be stored on different storage resources using the network-aware caching techniques described herein.

Figure 3B:
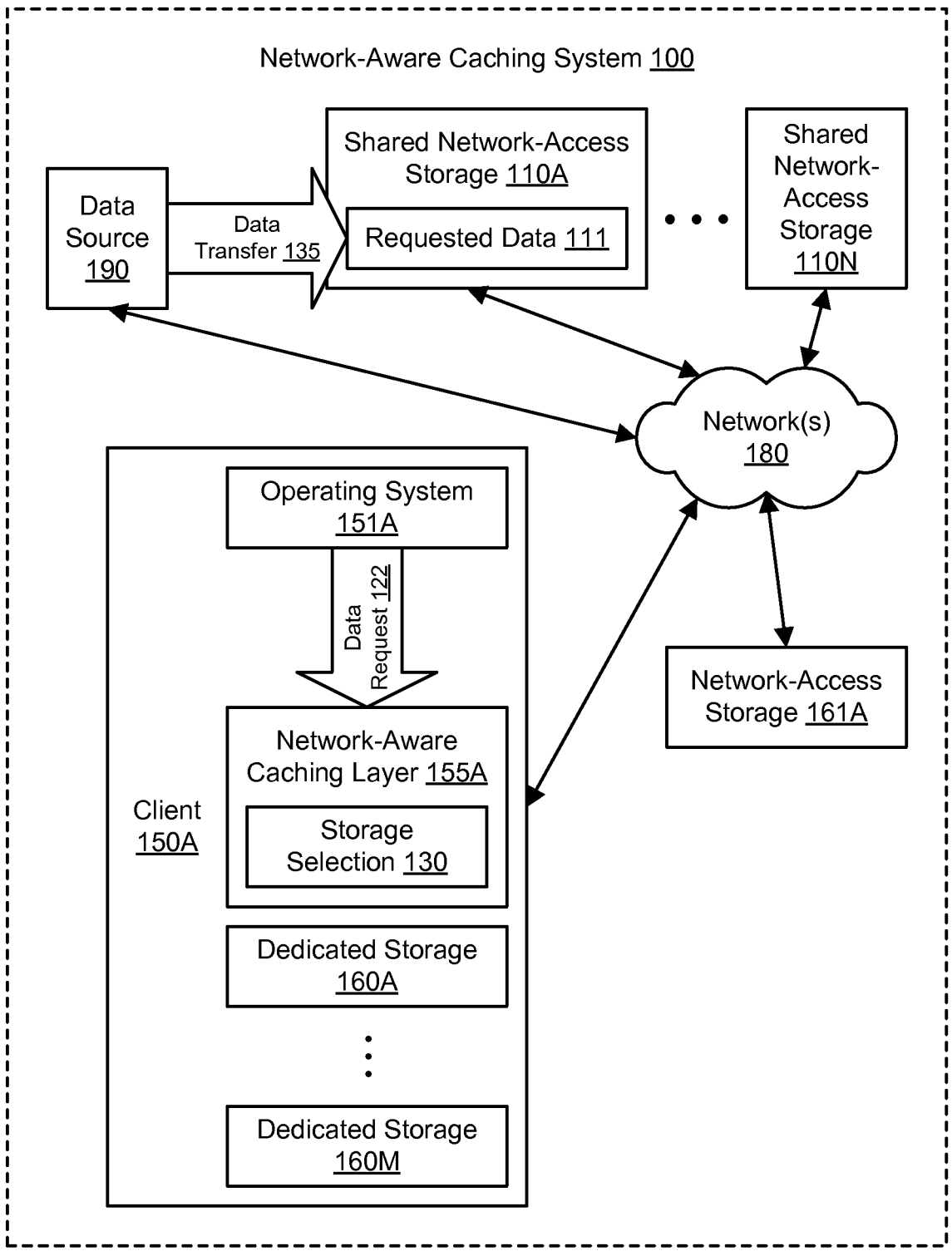
FIG. 3B illustrates further aspects of the example system environment for network-aware caching, including a network-aware caching layer selecting a shared network-access storage location for storing requested data, according to one embodiment.

FIG. 3B illustrates further aspects of the example system environment for network-aware caching, including a network-aware caching layer selecting a shared network-access storage location for storing requested data, according to one embodiment. As discussed above, a client 150A may seek access to a particular chunk of data or other set of data. Accordingly, a component of the client 150A, such as a component of the operating system 151A, may issue a data request 122 to seek access to the data. Based on the differing performance characteristics of the shared network-access storage resources 110A-110N, dedicated storage resources 160A-160M, and/or network-access storage resources 161A the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the requesting client 150A.

In the example illustrated in FIG. 3B, the storage selection functionality 130 may select one of the shared network-access storage resources, such as shared network-access storage resource 110A. The selected storage location 110A may be chosen to enhance the latency, throughput, cost, reliability, durability, and/or security of the access. For example, the shared network-access storage resource 110A may be chosen over any of the dedicated storage resources 160A-160M or network-access storage resources 161A because it is expected to provide data access with superior reliability, durability, and/or security with acceptable levels of latency and throughput. As another example, the shared network-access storage resource 110A may be chosen over any of the dedicated storage resources 160A-160M, network-access storage resources 161A, and other shared network-access storage resources because it is expected to provide the lowest-cost access with acceptable levels of latency, throughput, reliability, durability, and/or security. In some network environments, data transfer between one or more shared network-access storage resources and a client may be sufficiently fast that much of the data requested by the client may be cached on the shared network-access storage locations using the network-aware caching system 100.

As indicated by the data transfer request 135 shown in FIG. 3B, the network-aware caching layer 155A may cause the requested data 111 to be copied from a data source 190 to the selected storage location 110A for optimized access by the client 150A. The data source 190 may represent any suitable storage location in the network-aware caching system 100, including one of the shared network-access storage devices 110A-110N, one of the network-access storage devices 161A-161N, or dedicated storage 160A-160N. The requested data 111 may be pushed or pulled to the selected storage location, and the requested data 111 may be transferred to the selected storage location with or without the network-aware caching layer 155A as an intermediary. In one embodiment, access to the copy of the data 111 may then be mediated by the network-aware caching layer 155A, e.g., by the caching layer 155A emulating a logical storage device to respond to read and/or write requests involving the data 111 from the operating system 151A of the client 150A. Access by the client 150A to the requested data 111 may involve the use of a network access interface (e.g., network card) of the client 150A, e.g., to transfer elements of the requested data 111 from the shared network-access storage 110A to the client 150A over the network(s) 180 or to transfer modifications to the requested data 111 from the client 150A to the shared network-access storage 110A over the network(s) 180.

Figure 3C:
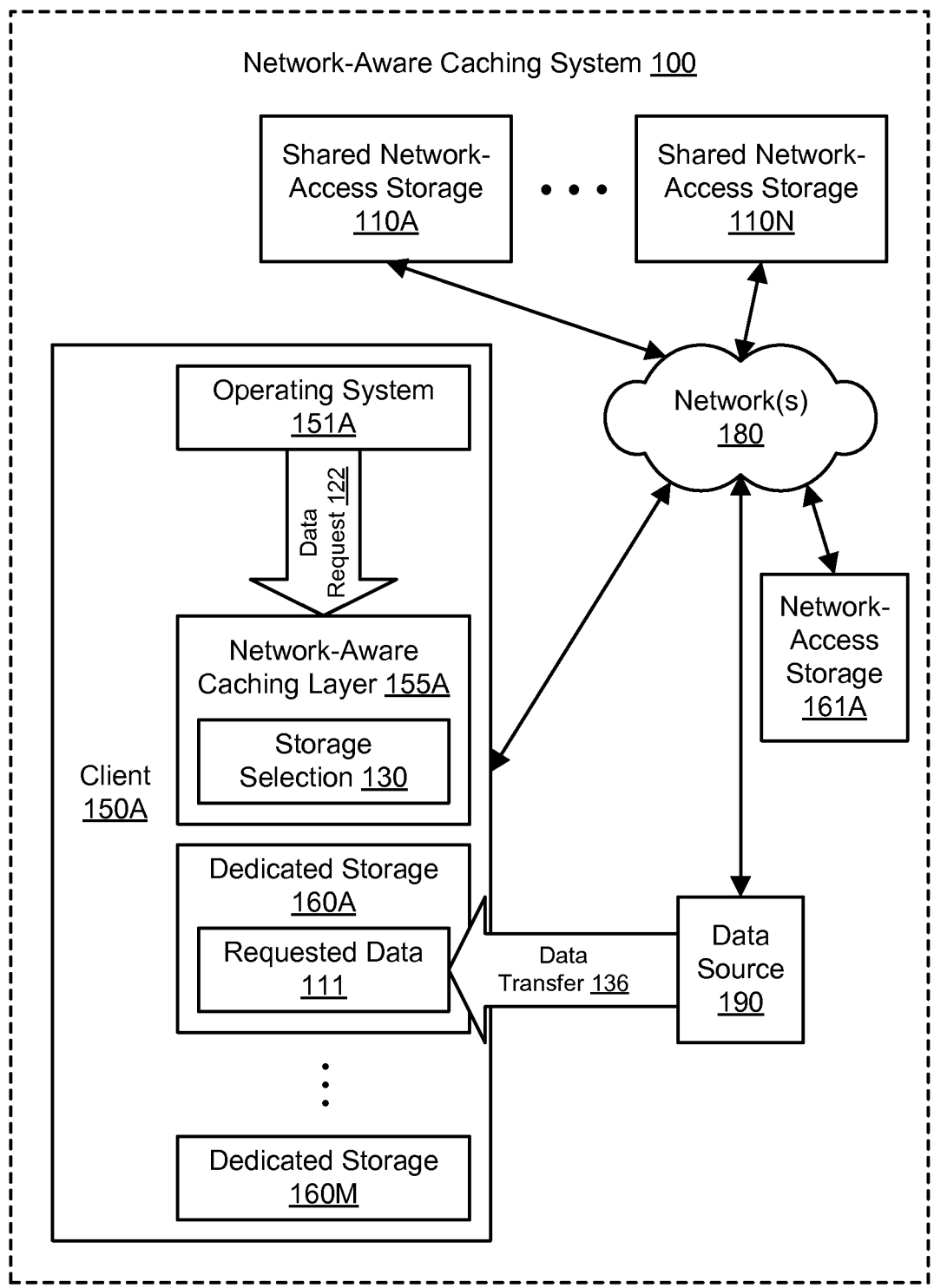
FIG. 3C illustrates further aspects of the example system environment for network-aware caching, including a network-aware caching layer selecting a dedicated storage location for storing requested data, according to one embodiment.

FIG. 3C illustrates further aspects of the example system environment for network-aware caching, including a network-aware caching layer selecting a dedicated storage location for storing requested data, according to one embodiment. As discussed above, a client 150A may seek access to a particular chunk of data or other set of data. Accordingly, a component of the client 150A, such as a component of the operating system, may issue a data request 122 to seek access to the data. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the requesting client 150A.

In the example illustrated in FIG. 3C, the storage selection functionality 130 may select one of the dedicated storage resources, such as dedicated storage resource 160A. The selected storage location 160A may be chosen to enhance the latency, throughput, cost, reliability, durability, and/or security of the access. For example, the dedicated storage resource 160A may be chosen over any of the shared network-access storage resources 110A-110N or network-access storage resources 161A because it is expected to provide data access with superior latency and throughput with acceptable levels of reliability, durability, and/or security. As another example, the dedicated storage resource 160A may be chosen over any of the shared network-access storage resources 110A-110N, network-access storage resources 161A, and other dedicated storage resources because it is expected to provide the lowest-cost access with acceptable levels of latency, throughput, reliability, durability, and/or security.

As indicated by the data transfer request 136 shown in FIG. 3C, the network-aware caching layer 155A may cause the requested data 111 to be copied from a data source 190 to the selected storage location 160A for optimized access by the client 150A. The data source 190 may represent any suitable storage location in the network-aware caching system 100, including one of the shared network-access storage devices 110A-110N, one of the network-access storage devices 161A-161N, or dedicated storage 160A-160N. The requested data 111 may be pushed or pulled to the selected storage location, and the requested data 111 may be transferred to the selected storage location with or without the network-aware caching layer 155A as an intermediary. In one embodiment, access to the copy of the data 111 may then be mediated by the network-aware caching layer 155A, e.g., by the caching layer 155A emulating a logical storage device to respond to read and/or write requests involving the data 111 from the operating system 151A of the client 150A. Access by the client 150A to the requested data 111 may avoid the use of a network access interface (e.g., network card) of the client 150A.

Figure 3D:
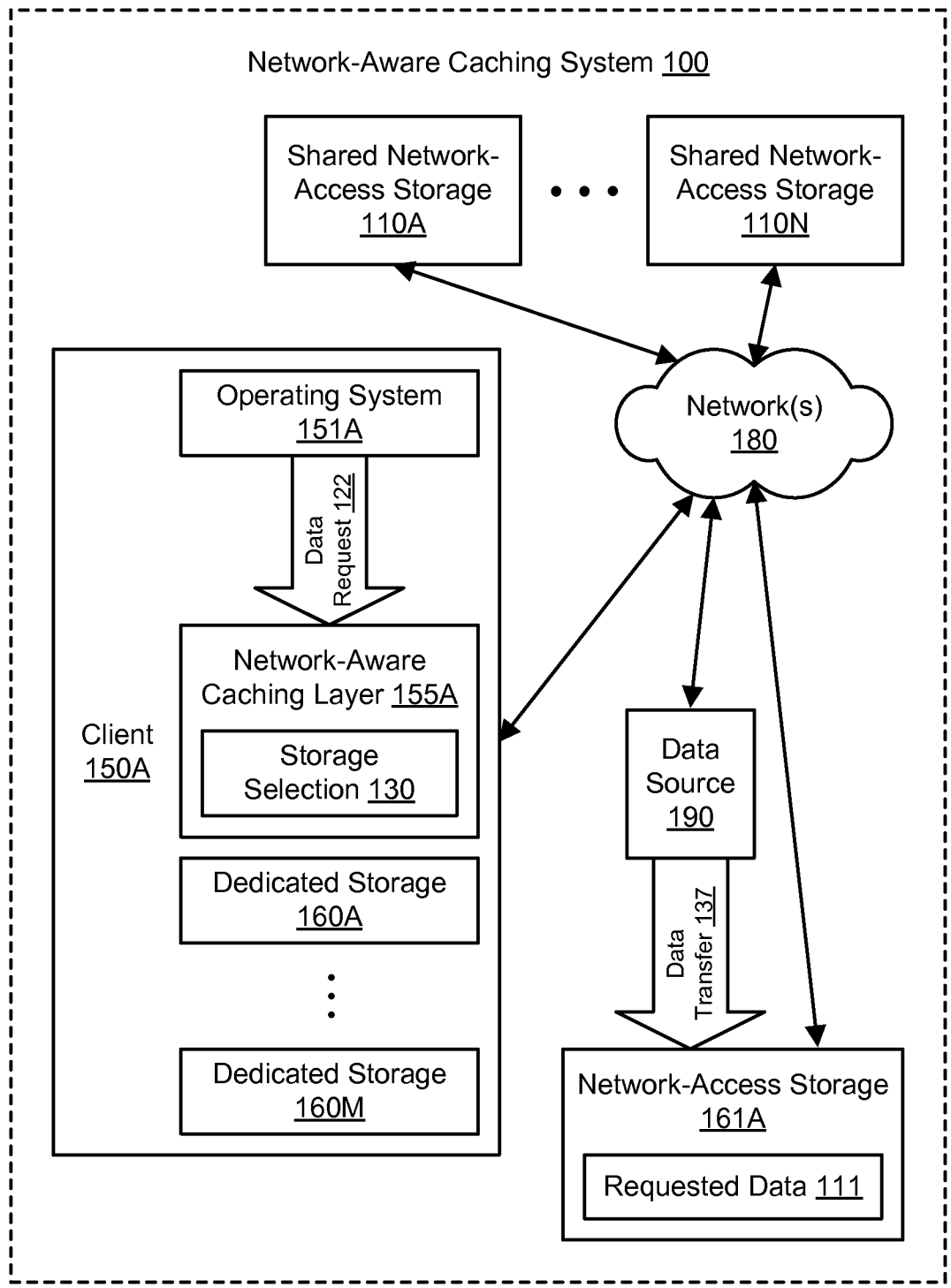
FIG. 3D illustrates further aspects of the example system environment for network-aware caching, including a network-aware caching layer selecting a network-access storage location for storing requested data, according to one embodiment.

FIG. 3D illustrates further aspects of the example system environment for network-aware caching, including a network-aware caching layer selecting a network-access storage location for storing requested data, according to one embodiment. As discussed above, a client 150A may seek access to a particular chunk of data or other set of data. Accordingly, a component of the client 150A, such as a component of the operating system 151A, may issue a data request 122 to seek access to the data. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the requested data. The storage location may also be selected based on one or more user access patterns, e.g., relating to the requested data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the requesting client 150A.

In the example illustrated in FIG. 3D, the storage selection functionality 130 may select one of the network-access storage resources 161A. The selected storage location 161A may be chosen to enhance the latency, throughput, cost, reliability, durability, and/or security of the access. For example, the network-access storage resource 161A may be chosen over any of the dedicated storage resources 160A-160M or shared network-access storage resources 110A-110N because it is expected to provide data access with superior reliability, durability, and/or security with acceptable levels of latency and throughput. As another example, the network-access storage resource 161A may be chosen over any of the dedicated storage resources 160A-160M and shared network-access storage resources 110A-110N because it is expected to provide the lowest-cost access with acceptable levels of latency, throughput, reliability, durability, and/or security. In some network environments, data transfer between one or more network-access storage resources and a client may be sufficiently fast that much of the data requested by the client may be cached on the network-access storage locations using the network-aware caching system 100.

As indicated by the data transfer request 137 shown in FIG. 3D, the network-aware caching layer 155A may cause the requested data 111 to be copied from a data source 190 to the selected storage location 161A for optimized access by the client 150A. The data source 190 may represent any suitable storage location in the network-aware caching system 100, including one of the shared network-access storage devices 110A-110N, one of the network-access storage devices 161A-161N, or dedicated storage 160A-160N. The requested data 111 may be pushed or pulled to the selected storage location, and the requested data 111 may be transferred to the selected storage location with or without the network-aware caching layer 155A as an intermediary. In one embodiment, access to the copy of the data 111 may then be mediated by the network-aware caching layer 155A, e.g., by the caching layer 155A emulating a logical storage device to respond to read and/or write requests involving the data 111 from the operating system 151A of the client 150A. Access by the client 150A to the requested data 111 may involve the use of a network access interface (e.g., network card) of the client 150A, e.g., to transfer elements of the requested data 111 from the network-access storage 161A to the client 150A over the network(s) 180 or to transfer modifications to the requested data 111 from the client 150A to the network-access storage 161A over the network(s) 180.

Figure 3E:
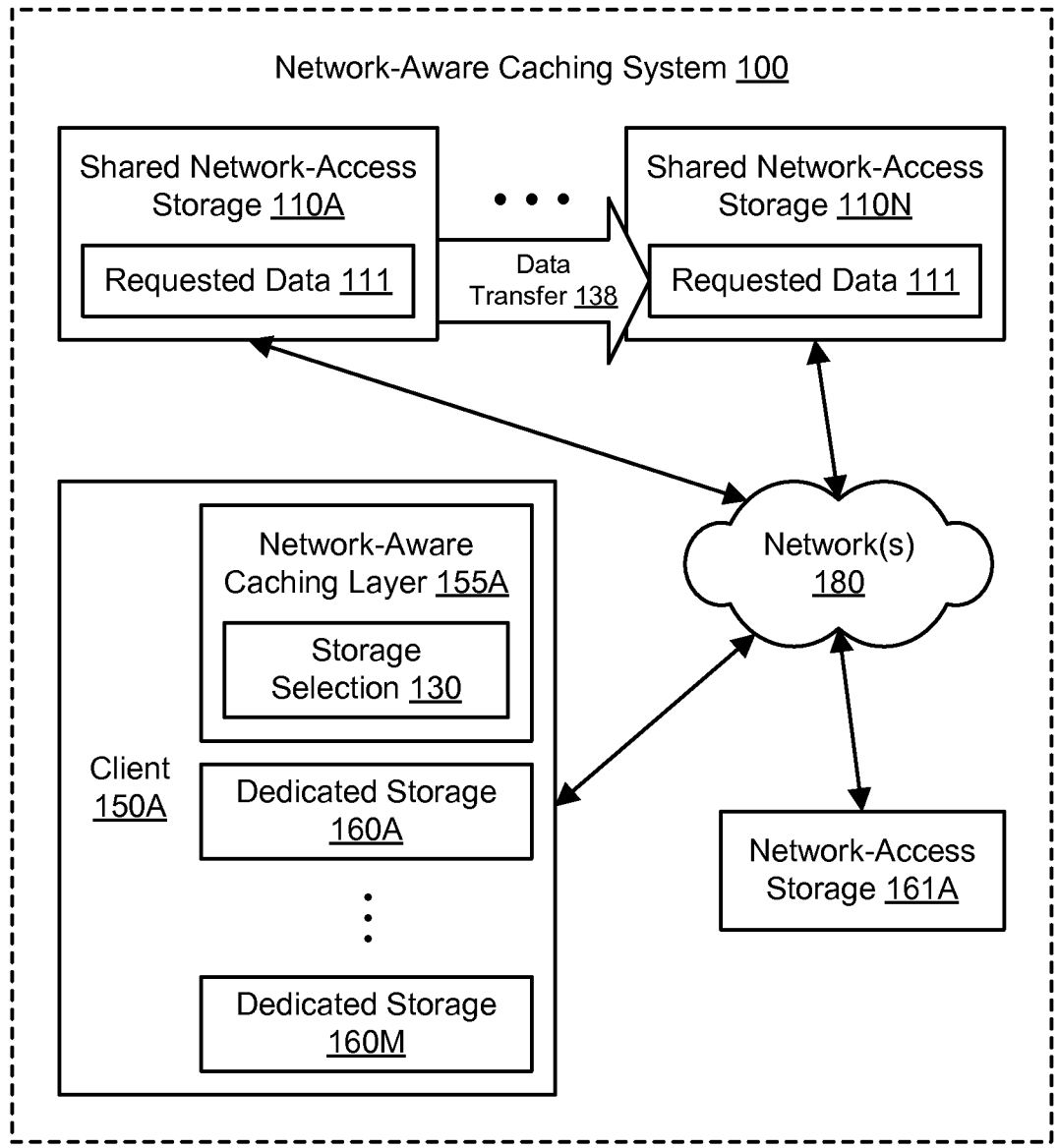
FIG. 3E illustrates further aspects of the example system environment for network-aware caching, including a network-aware caching layer selecting a new storage location for previously cached data, according to one embodiment.

FIG. 3E illustrates further aspects of the example system environment for network-aware caching, including a network-aware caching layer selecting a new storage location for previously cached data, according to one embodiment. In one embodiment, the storage selection functionality 130 may reassess the performance characteristics of various storage locations, e.g., to respond to changing conditions or changing configurations in the network-aware caching system 100. In one embodiment, the storage selection functionality 130 may reassess user access patterns to various storage locations and/or sets of data, e.g., to determine whether the storage locations and/or sets of data are more frequently accessed or less frequently accessed over time. The performance characteristics and/or user access patterns may be reassessed at any suitable time and for any suitable number of times.

In one embodiment, the storage selection functionality 130 may modify the location of previously cached data based on the reassessment of performance characteristics and/or user access patterns. Based on the differing performance characteristics of the shared network-access storage resources 110A-110N, dedicated storage resources 160A-160M, and/or network-access storage resources 161A, the storage selection functionality 130 may select one or more of the shared network-access storage resources 110A-110N, dedicated storage resources 160A-160M, and/or network-access storage resources 161A to store the previously cached data. In one embodiment, the storage selection functionality 130 may implement a constrained optimization process to select one or more of the storage resources. The constrained optimization process may include optimizing an objective function for one or more variables in the presence of constraints on those variables. The objective function may represent a cost function or energy function to be minimized or a reward function or utility function to be maximized. For example, the objective function may be solved to minimize latency, maximize throughput, minimize cost, maximize reliability, maximize durability, and/or maximize security, subject to constraints such as the available storage on a device and/or available bandwidth between a storage location and the client 150A.

In the example illustrated in FIG. 3E, the data was previously cached in shared network-access storage 110A, and the storage selection functionality 130 may select another one of the storage resources, such as shared network-access storage resource 110N. However, it is contemplated that the previously cached data may be transferred from substantially any storage location to any other storage location in the network-aware caching system 100. The selected storage location 110N may be chosen to enhance the latency, throughput, cost, reliability, durability, and/or security of the access.

As indicated by the data transfer request 138 shown in FIG. 3E, the network-aware caching service 120 may cause the requested data 111 to be copied from the previously selected storage location 110A to the newly selected storage location 110N for optimized access by the client 150A. The data 111 may also be deleted from the previously selected storage location 110A. In one embodiment, access to the copy of the data 111 may then be mediated by the network-aware caching layer 155A, e.g., by the caching layer 155A emulating a logical storage device to respond to read and/or write requests involving the data 111 from the operating system of the client 150A. Access by the client 150A to the requested data 111 may involve the use of a network access interface (e.g., network card) of the client 150A, e.g., to transfer elements of the requested data 111 from the shared network-access storage 110N to the client 150A over the network(s) 180 or to transfer modifications to the requested data 111 from the client 150A to the shared network-access storage 110N over the network(s) 180.

Figure 4:
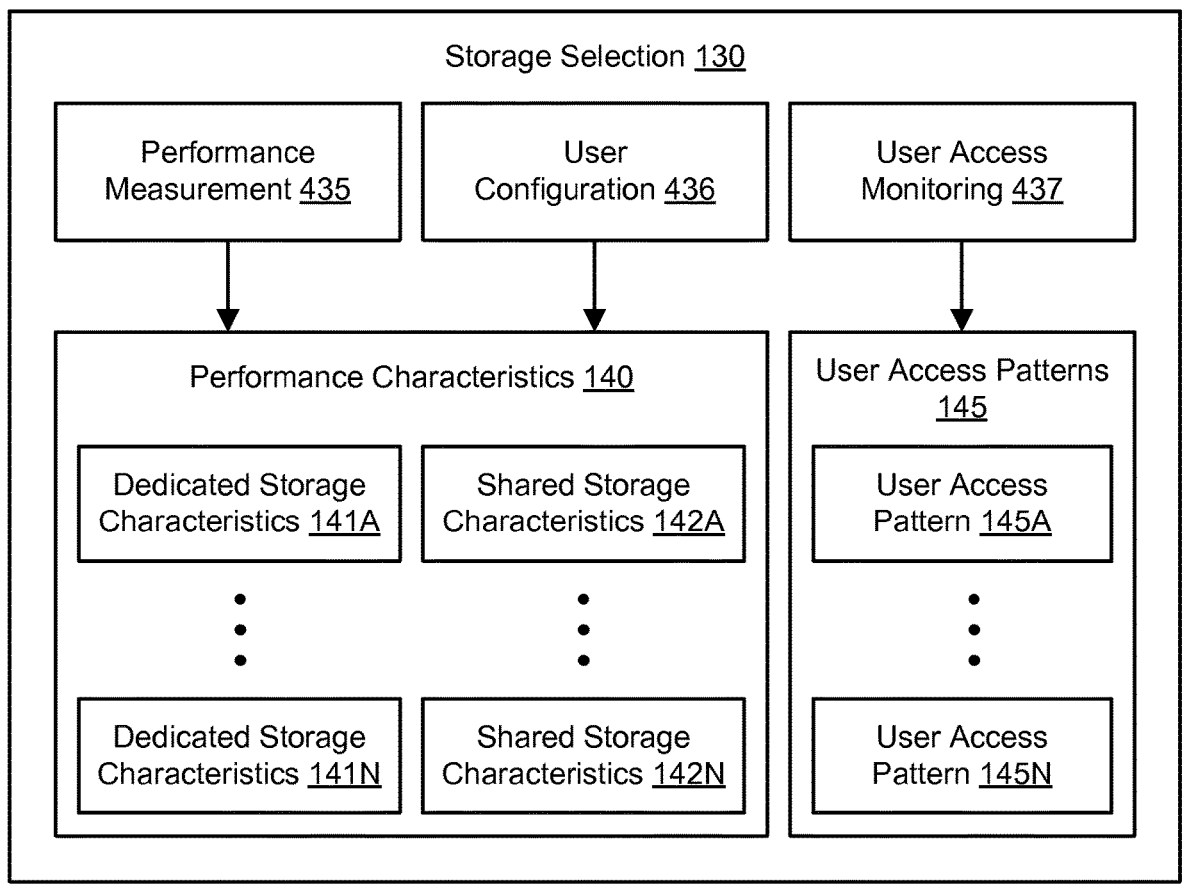
FIG. 4 illustrates further aspects of the example system environment for network-aware caching, including the determination of performance characteristics for storage resources, according to one embodiment.

FIG. 4 illustrates further aspects of the example system environment for network-aware caching, including the determination of performance characteristics for storage resources, according to one embodiment. In selecting one or more storage locations, the storage selection functionality 130 may reference various types of performance characteristics 140 that describe aspects of the performance of various storage devices. In various embodiments, different sources of data may be used in determining the performance characteristics 435. Although FIG. 4 illustrates performance measurement 435 and user configuration 436 as two such sources, it is contemplated that other sources of performance characteristics may be used instead of or in combination with the illustrated sources. For each client computing device, the performance characteristics may describe aspects of data access between the particular client computing device and a particular storage resource, such as dedicated storage characteristics 141A-141N for various dedicated storage resources and shared storage characteristics 142A-142N for various shared network-access storage resources.

In one embodiment, performance measurement 435 may be used to generate performance characteristics 140. The performance measurement 435 may be implemented using any suitable technique(s) and component(s), e.g., by executing performance monitoring software at various points in the network-aware caching system 100 to generate performance metrics. The performance measurement 435 may determine up-to-date performance characteristics 140 of storage devices, e.g., based on recent activity that is expected to reflect recent conditions in the network-aware caching system 100. The performance measurement 435 may update the performance characteristics 140 of storage devices based on recently generated metrics. In one embodiment, the performance measurement 435 may maintain historical performance characteristics of storage devices, e.g., based on less recent activity. Using performance metrics determined based on real activity, the network-aware caching system 100 may adapt to changing conditions to select optimized storage locations at a given point in time.

In one embodiment, the performance metrics may indicate the latency for data access between a particular client computing device and a particular storage resource, e.g., the time between the request to the network-aware caching layer and the first byte of data returned to the caller. In one embodiment, the performance metrics may indicate the throughput for data access between a particular client computing device and a particular storage resource, e.g., the average number of bytes per second. In one embodiment, the performance metrics may indicate the available bandwidth for data access between a particular client computing device and a particular storage resource. In one embodiment, the performance metrics may indicate the available amount of storage on a particular storage resource. In one embodiment, the performance metrics may indicate the reliability of data access between a particular client computing device and a particular storage resource, e.g., the probability that the data will be available when requested. In one embodiment, the performance metrics may indicate the durability of data storage using a particular storage resource, e.g., the probability that the data will not be corrupted over time. In one embodiment, the performance metrics may indicate the security of data access between a particular client computing device and a particular storage resource and/or the security of data storage using a particular storage resource, e.g., the probability that access to the data will be properly restricted. In one embodiment, the performance characteristics may represent a histogram of bandwidth measured by time of request. Accordingly, the performance characteristics may indicate a degree of "burstiness" of a storage device, e.g., following a particular data request.

In one embodiment, user configuration 436 may be used to determine performance characteristics 140. The user configuration 436 may be implemented using any suitable technique(s) and component(s), e.g., one or more user interfaces that enable a user to enter, approve, and/or modify configuration values. In one embodiment, the configuration values may indicate particular storage resources or categories of storage resources to be considered for use with a particular client computing device or a particular customer. In one embodiment, the configuration values may indicate the estimated cost for data access between one or more client computing devices and a particular storage resource. In one embodiment, the configuration values may represent constraints for the optimization process that selects a storage resource. In one embodiment, the configuration values may indicate the maximum acceptable cost for data access between one or more client computing devices and one or more storage resources. In one embodiment, the configuration values may indicate a budget representing a maximum acceptable cost for data access involving one or more client computing devices.

In one embodiment, the configuration values may indicate the maximum acceptable latency for data access between one or more client computing devices and one or more storage resources. In one embodiment, the configuration values may indicate the minimum acceptable throughput for data access between one or more client computing devices and one or more storage resources. In one embodiment, the configuration values may indicate the minimum acceptable reliability for data access between one or more client computing devices and one or more storage resources. In one embodiment, the configuration values may indicate the minimum acceptable durability for data storage using one or more storage resources. The configuration values may also indicate the importance of a chunk of data or type of data, such that the importance may be used to determine the minimum acceptable durability level. The importance of the data may determine how often that data is flushed to a persistent storage device. In one embodiment, the configuration values may indicate the minimum acceptable security of data access between a particular client computing device and a particular storage resource and/or the minimum acceptable security of data storage using a particular storage resource. The configuration values may also indicate the sensitivity of a chunk of data or type of data, such that the sensitivity may be used to determine the minimum acceptable security level.

In one embodiment, the network-aware caching system 100 may manage the bandwidth to or from any data storage location, e.g., to minimize network bandwidth or bandwidth to or from dedicated storage. If network congestion is encountered, a component of the network-aware caching system 100 such as the network-aware caching service 120 may send an indication of a bandwidth restriction to one or more storage location. In light of the bandwidth restriction, a recipient storage device may lower its bandwidth usage to improve the network congestion.

In selecting one or more storage locations, the storage selection functionality 130 may reference various user access patterns 145 that describe aspects of the user access (e.g., read and/or write access) to data over time. For example, the user access patterns 145 may indicate a frequency of user access for a particular data set and/or a time at which the data was most recently accessed by the user. As another example, the user access patterns 145 may indicate whether the user tends to ask for large blocks of data or small blocks of data. To generate the user access patterns 145, the storage selection functionality 130 may implement user access monitoring 437 using any suitable technique(s). The user access monitoring 437 may monitor access to elements of a file system and not necessarily access to particular storage devices. Although two user access patterns 145A and 145N are shown, it is contemplated that any suitable number of user access patterns may be generated and used to select storage locations.

Figure 5:
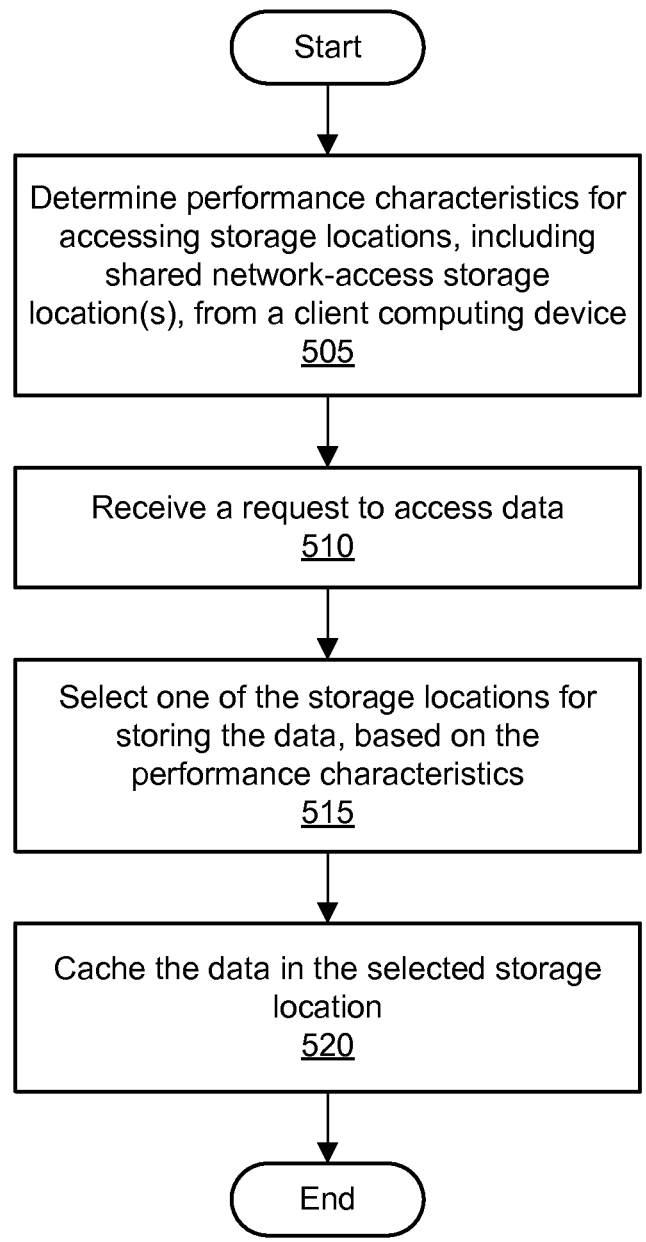
FIG. 5 is a flowchart illustrating a method for network-aware caching, according to one embodiment.

FIG. 5 is a flowchart illustrating a method for network-aware caching, according to one embodiment. As shown in 505, performance characteristics may be determined for accessing storage locations from one or more clients. The storage locations may include shared network-access storage devices that are accessible by the client(s) over a network. The storage locations may also include dedicated storage devices or subsystems that are managed by clients and/or network-access storage devices that are exclusively accessible to single clients. At least some of the performance characteristics may be determined using performance measurement to generate performance metrics. At least some of the performance characteristics may be determined based on configuration values entered by a user. In general, the performance characteristics may relate to the latency, throughput, cost, reliability, durability, and/or security of data access involving one or more clients and one or more storage locations.

As shown in 510, a request to access a set of data may be received, e.g., by a network-aware caching service or a network-aware caching layer on a client that implements such a service. As shown in 515, one of the storage locations may be selected for storing the requested data. The selected storage location may be chosen from a set of accessible storage locations based on the performance characteristics of the various storage locations. For example, the selected storage location may be chosen based on an optimization process that optimizes for one or more dimensions, such as the latency, throughput, cost, reliability, durability, and/or security of data access. In one embodiment, the storage location may be selected also based on one or more user access patterns. As shown in 520, the data may be stored in the selected storage location. Access to the requested data may then be provided to the requesting client in an optimized manner.

Network-Backed File System

Figure 6:
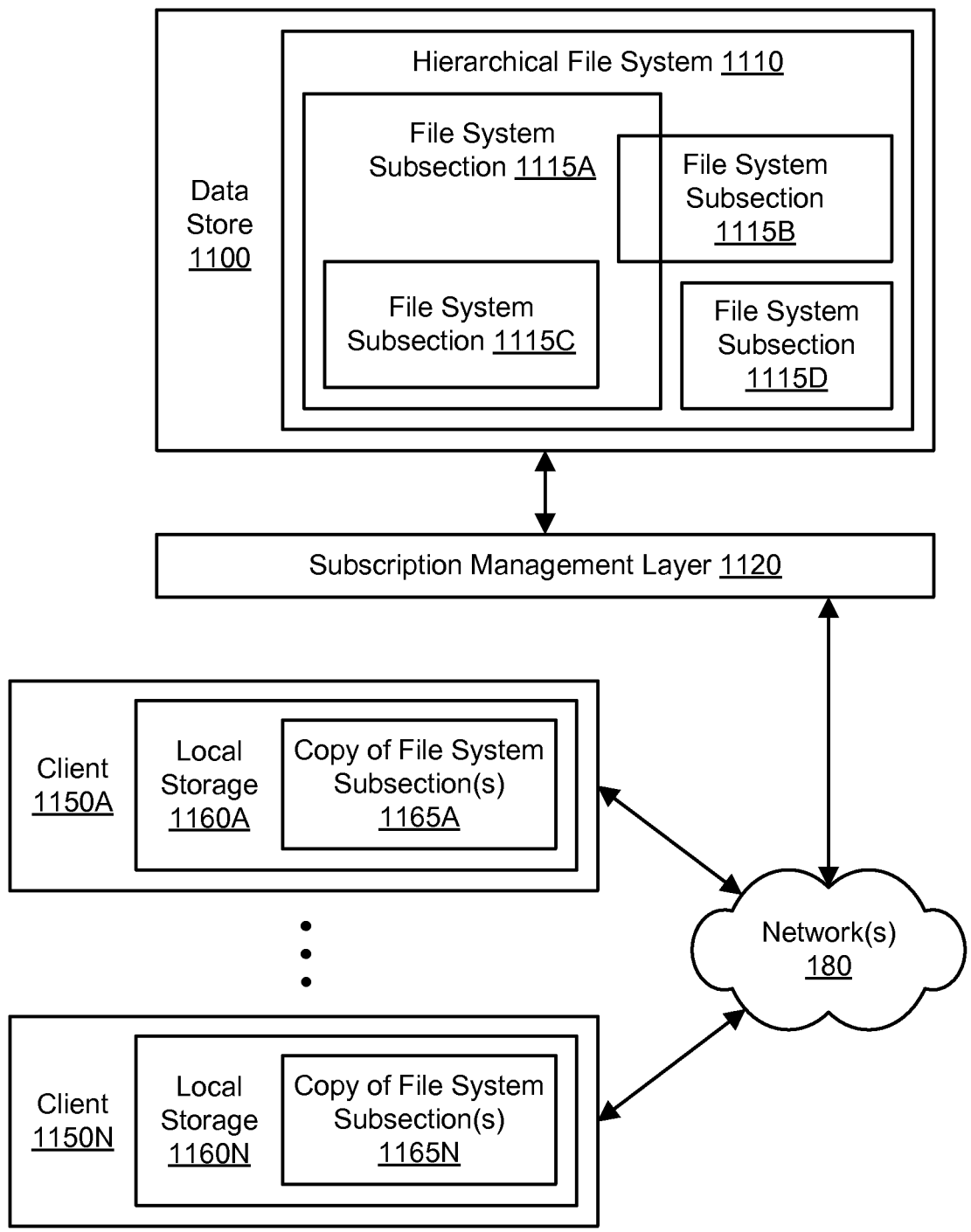
FIG. 6 illustrates an example system environment for a network-backed file system, according to one embodiment.

FIG. 6 illustrates an example system environment for a network-backed file system, according to one embodiment. The example system environment may include a data store 1100, a subscription management layer 1120, and a plurality of clients 1150A-1150N that are coupled via one or more networks 180. Although two clients 1150A and 1150N are shown for purposes of illustration, it is contemplated that different numbers and/or configurations of clients may be used with the network-backed file system. The data store 1100 and subscription management layer 1120 may provide the functionality of a network-backed file system to the plurality of clients 1150A-1150N. The data store 1100 may store and maintain a hierarchical file system 1110. The data store 1100 and subscription management layer 1120 may together function as a file system subscription management service.

The data store 1100 may comprise one or more computing devices, any of which may be implemented by the example computing device 3000 illustrated in FIG. 14. The subscription management layer 1120 may also comprise one or more computing devices, any of which may be implemented by the example computing device 3000 illustrated in FIG. 14. Similarly, each of the clients 1150A-1150N may comprise one or more computing devices, any of which may be implemented by the example computing device 3000 illustrated in FIG. 14. The data store 1100 may include or otherwise manage storage resources on which the file system 1110 (including file system data and file system metadata) is stored. In various embodiments, the functionality of the different services, components, and/or modules of the data store 1100 or subscription management layer 1120 may be provided by the same computing device or by different computing devices. If any of the various elements of the data store 1100 or subscription management layer 1120 are implemented using different computing devices, then the respective computing devices may be communicatively coupled, e.g., via the network(s) 180. The data store 1100 and the subscription management layer 1120 may each represent any combination of software and hardware usable to perform their respective functions, as discussed as follows.

Any suitable file system technologies and/or storage management technologies may be used to implement the hierarchical file system 1110 maintained by the data store 1100. In one embodiment, the file system 1110 may store a plurality of files that are organized using a hierarchy of directories. The file system 1110 may manage the storage, retrieval, and updating of the files and directories. Beginning with a root directory, the hierarchy of directories may include subdirectories (i.e., child directories) within directories (i.e., parent directories). Each directory may include files. In one embodiment, individual files may be divided into file chunks, as will be described in greater detail below. Each file or directory may be accessed by specifying its pathname. A directory in the file system 1110 may be identified by a pathname that includes the root directory, the directory names of any intermediate subdirectories (in parent-child order), and the directory name. A file in the file system 1110 may be identified by a pathname that includes the root directory, the directory names of any intermediate subdirectories (in parent-child order), and the name of the file. In one embodiment, for files that are divided into file chunks, a chunk may be individually accessible using an index number or other suitable identifier. Additionally, multiple chunks may be accessible via a range of indexes.

The file system may include a plurality of subsections. Each of the subsections may include one or more directories (including one or more child directories), one or more files, and/or one or more portions of a file (e.g., file chunks). Examples of file system subsections 1115A, 1115B, 1115C, and 1115D are shown in FIG. 6. However, it is contemplated that different numbers and/or configurations of file system subsections may be included in the file system 1110. As shown in the example, a first file system subsection 1115A and a second file system subsection 1115B may have a partial overlap. Additionally, a third file system subsection 1115C may be contained completely within the first file system subsection 1115A; for example, the third file system subsection 1115C may be one or more subdirectories or one or more files within the first file system subsection 1115A. A fourth file system subsection 1115D may be completely separate and distinct from the other file system subsections 1115A, 1115B, and 1115C.

Individual ones of the clients 1150A-1150N may subscribe to one or more subsections of the file system 1110. The subscriptions may include read subscriptions to enable making local copies of the contents of one or more subsections of the file system 1110 and/or write subscriptions to enable updating the contents of one or more subsections of the file system 1110. In various embodiments, a client may subscribe to one or more directories (including one or more child directories), one or more files, and/or one or more portions of a file (e.g., file chunks). In one embodiment, a subscription may include directories, files, and/or chunks that are specifically named in a subscription request. In one embodiment, a subscription may include directories, files, and/or chunks that meet specified criteria. As an example of a named subsection in a subscription, for a network-backed file system (NBFS) named "my-test-data", a client may subscribe (for read and/or write access) to a particular directory that is accessible by a string such as "NBFS://my-test-data/test/dataset1/*", where the asterisk is a wildcard character representing access to all files in the directory as well as any subdirectories and their contents. In one embodiment, a subscription may request access to files matching one or more filters. The filters may be based on any suitable data or metadata, including, but not limited to, file size, the cutting algorithm used to generate file chunks for the file, user-specified tags, creation date (or a range of creation dates), modification date (or a range of modification dates), the user who created the file, the user who last modified the file, the data type of the file, etc. Any suitable file metadata may be used to determine the data type. In one embodiment, the file contents may be inspected to determine the data type.

The subscription management layer 1120 may provide an interface between the clients 1150A-1150N and the data store 1100. In one embodiment, the subscription management layer 1120 may perform tasks related to storing the subscriptions, maintaining the subscriptions, and otherwise provide management of the subscriptions. The subscription management layer 1120 may be implemented using any suitable interface(s) (e.g., an application programming interface) to enable communication regarding subscriptions between the data store 1100 and the clients 1150A-1150N. In one embodiment, the subscription management layer 1120 may include an application layer that performs aspects of the subscription management tasks described herein as well as a web services layer that enables the file system subscription management service to operate as a web-based service.

Each subscribing client may submit a subscription request to the subscription management layer 1120. A subscription request may include the identity of the subscribing client, the identity of the particular file system 1110 if more than one file system is maintained by the data store 1100, the type of read and/or write access sought by the client, an identification of the file system subsection(s) to which access is sought, and any other suitable information. In one embodiment, a subscription request may include authorization credentials for the client. In one embodiment, a subscription request may include a requested window of time for which access is sought. In one embodiment, a subscription request may include payment information or other information usable to compensate the provider of the data store 1100 for the requested access. The subscription information maintained by the subscription management layer 1120 may be used in fulfilling the subscriptions, e.g., by identifying the subscribing client, the type of access, and the identity of the file system subsection(s) to which a particular client has subscribed. The read subscriptions may be fulfilled by sending contents of relevant subsections to subscribing clients. The write subscriptions may be fulfilled by modifying contents of relevant subsections based on write requests submitted by subscribing clients.

In various embodiments, cancellation or revocation of a subscription may be initiated by the subscription management layer 1120 and/or the subscribing client. For example, a subscription may be cancelled by the subscription management layer 1120 if a staleness threshold for communication with a client is met or exceeded. The staleness threshold may function as a timeout if the subscription management layer 1120 cannot verify that a client is responsive to communications. The threshold may vary by the type of subscription, such that a write-only-locked subscription may time out (and thus be revoked) before a read-live subscription.

Each of the subscribing clients 1150A-1150N may include and/or manage local storage resources. For example, the client 1150A may include local storage resources 1160A, and the client 1150N may include local storage resources 1160N. The local storage resources 1160A-1160N may be implemented using the dedicated storage 160A-160N and/or network-access storage 161A-161N discussed above with respect to FIG. 1. Additionally, the network-aware caching layer as discussed above may present itself to a client as if it were local storage. Accordingly, any of the local storage resources 1160A-1160N may include a network-aware caching layer as discussed above. As discussed below with respect to FIG. 14, it is contemplated that various types of storage technologies may be used to implement the local storage resources 1160A-1160N. The local storage resources 1160A-1160N may be used to store the contents of one or more file system subsections copied from the file system 1110 maintained by the data store 1100. As shown in the example of FIG. 6, the local storage 1160A of the client 1150A may include a copy 1165A of one or more of the file system subsection(s) maintained by the data store 1100. Similarly, the local storage 1160N of the client 1150N may include a copy 1165N of one or more of the file system subsection(s) maintained by the data store 1100. If the client 1150A and the client 1150N subscribe to different ones of the file system subsections 1115A, 1115B, 1115C, and 1115D, then the contents of the local storage 1160A may differ from the contents of the local storage 1160N. For example, if the client 1150A has a read subscription to the file system subsection 1115B while the client 1150N has a read subscription to the file system subsection 1115D, then the local storage 1160A may store a copy of the file system subsection 1115B while the local storage 1160N may store a copy of the file system subsection 1115D.

In one embodiment, clients 1150A-150N may handle transparent encryption so that the file system subsection data is transferred from the data store 1100 and/or subscription management layer 1120 in an encrypted manner and then automatically decrypted at the client. The decryption key may be provided to the client using a secure channel. In one embodiment, individual directories, files, and/or chunks within the same file system subsection, including different chunks within the same file, may be encrypted with different keys. In one embodiment, different chunks within the same file may be encrypted using the same key but with different key rotations.

The data store 1100 may be responsible for maintaining the coherency, integrity, and security of the file system 1100. The data store 1100 may also be responsible for maintaining one or more backups of the file system 1100. If all of the clients 1150A-1150N suffered failures at the same time, it is expected that the data store 1100 would continue to maintain the file system 1110 properly.

In one embodiment, the file system subscription management service may be operated in combination with the network-aware caching system 100 as discussed above. Accordingly, one or more of the shared network-access storage resources 110A-110N illustrated in FIG. 1 may implement the data store 1100, and one or more of the clients 1150A-1150N may implement a network-aware caching layer. For example, if one of the clients 1150A-1150N is subscribed to a large amount of data in the data store 1100 (e.g., with a read-only-live subscription) but only accessing a fraction of that data, then, using the network-aware caching system 100, that fraction of data may be kept on local storage for faster access.

Figure 7:
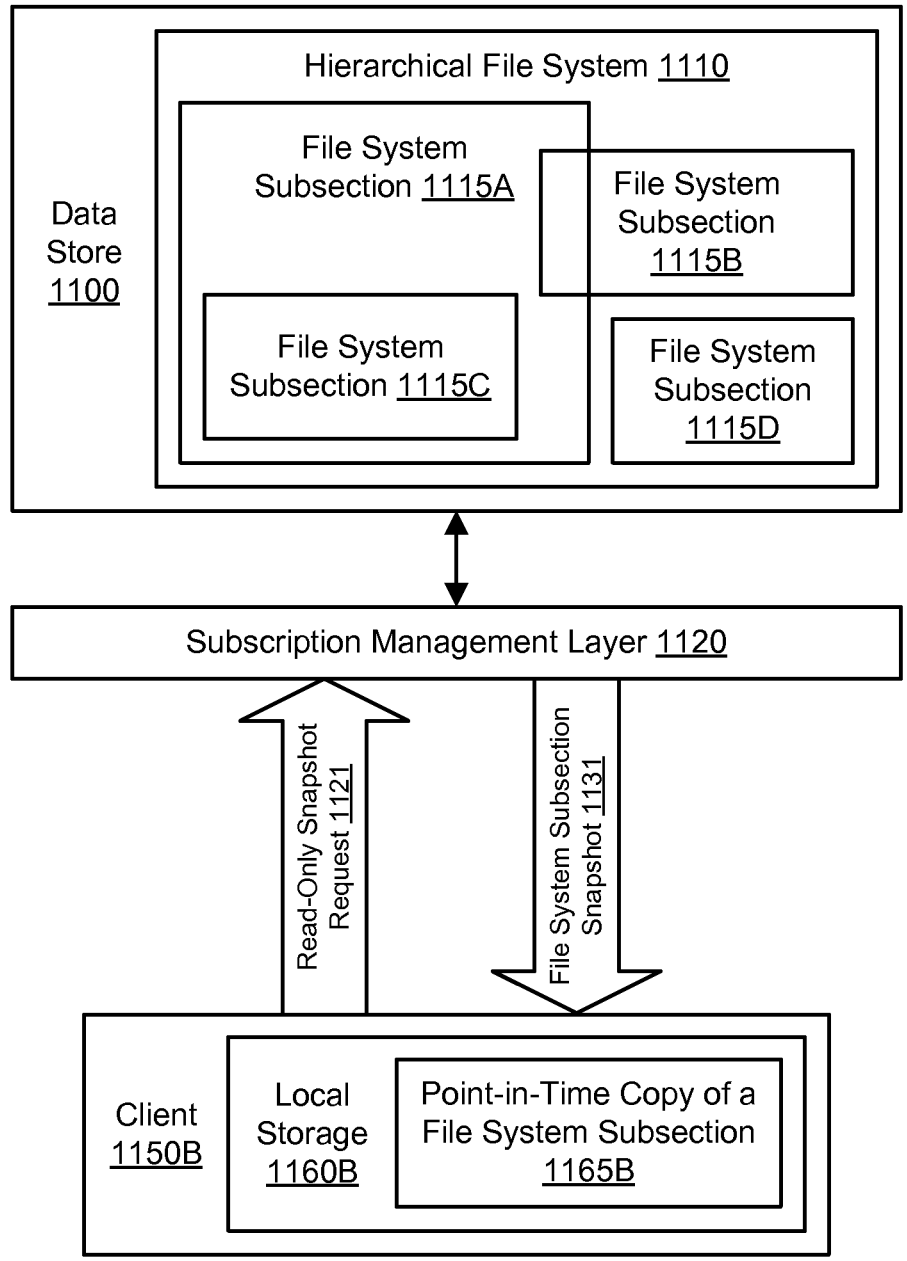
FIG. 7 illustrates an example system environment for a network-backed file system configured to fulfill a read-only snapshot request, according to one embodiment.

In one embodiment, the network-backed file system provided by the data store 1100 and subscription management layer 1120 may permit a client to obtain a read-only snapshot for one or more subsections of the file system 1110. FIG. 7 illustrates an example system environment for a network-backed file system configured to fulfill a read-only snapshot request, according to one embodiment. A client 1150B may submit a read-only snapshot request 1121 to the file system subscription management service. In one embodiment, the snapshot request may be received and processed by the subscription management layer 1120, and any subscription data resulting from the processing of the subscription request may be maintained by the subscription management layer 1120. The read-only snapshot request 1121 may seek to obtain a point-in-time copy of a file system subsection such as subsection 1115A, 1115B, 1115C, or 1115D. Accordingly, to fulfill the request, the data store 1100 may use any suitable techniques to generate a point-in-time copy (i.e., a snapshot) 1131 of the requested file system subsection and send the snapshot 1131 to the requesting client 1150B. The client 1150B may receive the snapshot 1131 from the data store 1100 and store it as a local point-in-time copy 1165B using local storage resources 1160B. In one embodiment, the snapshot 1131 may be received by the client 1150B using the subscription management layer 1120.

In one embodiment, because the snapshot request seeks only a single, point-in-time copy, updates to the relevant file system subsection on the data store 1100 are not automatically provided to the subscribing client 1150B. However, the client 1150B may submit another read-only snapshot request to obtain a copy of the latest version of the relevant file system subsection. In one embodiment, the client 1150B alternatively may submit a request to obtain any updates made to the relevant file system subsection since the point-in-time copy was made. In one embodiment, for files divided into file chunks, only updated file chunks may be sent as part of an update. The updates may be sent from the data store 1100 to the client 1150B using any suitable technique, e.g., a technique to express the updates as a delta of the current state of the relevant file system subsection and the earlier state of the subsection. The subscription management layer 1120 may determine the difference(s) between the state of the file system subsection at a first time and the state of the same subsection at a later time (e.g., the time at which the update request is received). Any suitable technique may be used to determine the difference between the versions of the subsection at the two different points in time.

In one embodiment, the network-backed file system provided by the data store 1100 and subscription management layer 1120 may permit a client to obtain a read-only-delta snapshot for one or more subsections of the file system 1110. As shown in FIG. 7, a client 1150B may submit a read-only snapshot request 1121 to the file system subscription management service. In some cases, the read-only snapshot request 1121 may comprise a request for a read-only-delta snapshot that expresses the difference in one or more file system subsections between two points in time. Accordingly, the request for the read-only-delta snapshot may specify the two points in time to be used in generating the comparison. The read-only-delta snapshot may include only those file chunks that have been modified from the beginning point in time to the ending point in time. To enable read-only-delta snapshots to be provided in this manner, the data store 1100 may be configured to maintain change information for a relevant subsection of the file system 1110 for a period of time. The period of time and the selection of file system subsections to be supported by the read-only-delta functionality may be configurable and may change over time according to the needs of clients. In one embodiment, a request for a read-only-delta snapshot may be accepted and fulfilled only if the points in time specified in the request are consistent with the range of time reflected in the change information stored for a particular file system subsection by the data store 1100. For example, if a particular file system subsection has been configured to maintain change information for a period of five days, then a request for a read-only-delta snapshot between two points over the last five days may be fulfilled.

Figure 8:
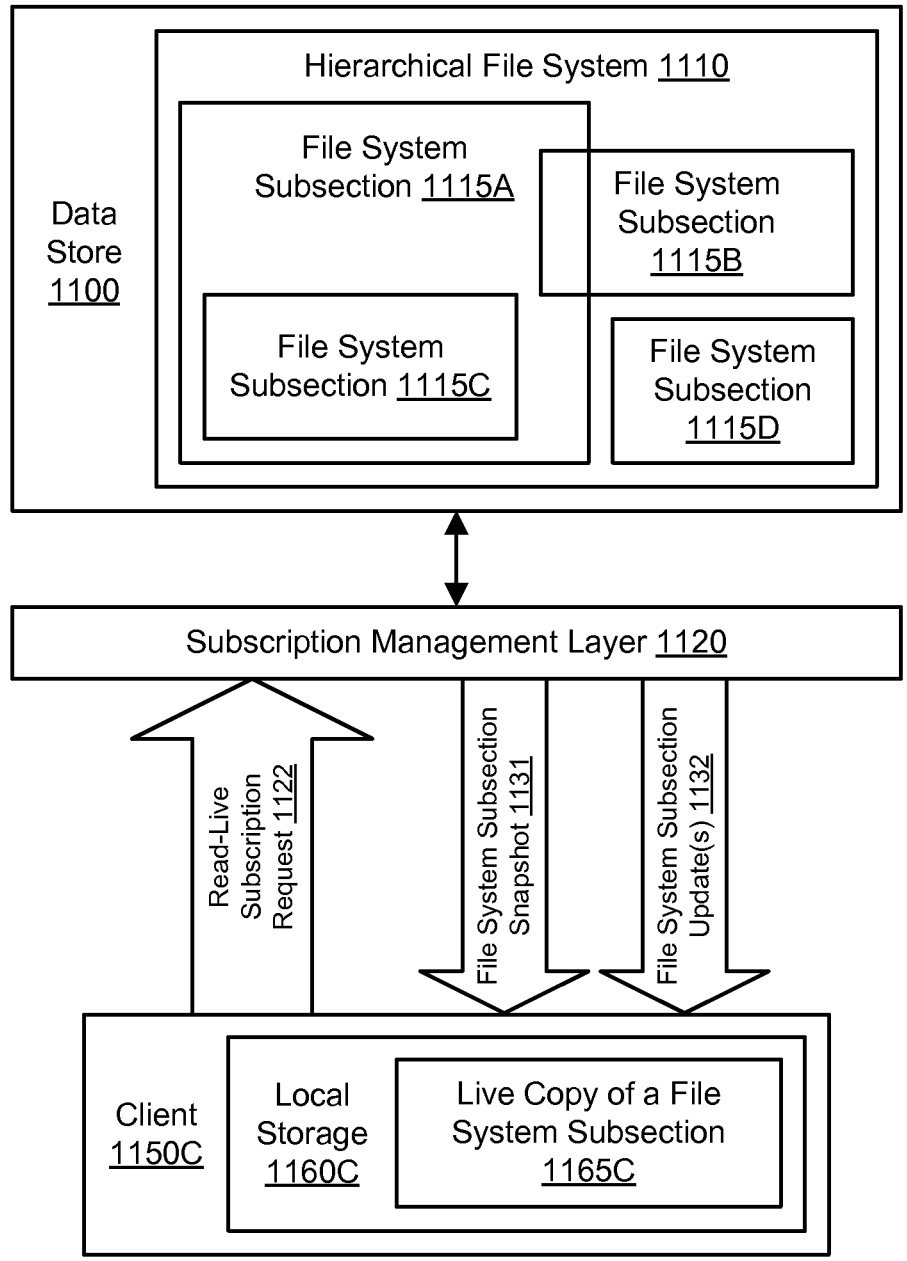
FIG. 8 illustrates an example system environment for a network-backed file system configured to fulfill a read-live subscription, according to one embodiment.

In one embodiment, the network-backed file system provided by the data store 1100 and subscription management layer 1120 may permit a client to have a read-live subscription to one or more subsections of the file system 1110. FIG. 8 illustrates an example system environment for a network-backed file system configured to fulfill a read-live subscription, according to one embodiment. A client 1150C may submit a read-live subscription request 1122 to the file system subscription management service. In one embodiment, the subscription request may be received and processed by the subscription management layer 1120, and any subscription data resulting from the processing of the subscription request may be maintained by the subscription management layer 1120. The read-live subscription request 1122 may seek to obtain a copy of a file system subsection (such as subsection 1115A, 1115B, 1115C, or 1115D) that is kept up to date at the client 1150C as the subsection is modified on the data store 1100. In one embodiment, to fulfill the request, the data store 1100 may use any suitable techniques to generate a point-in-time copy (i.e., a snapshot) 1131 of the requested file system subsection and send the snapshot 1131 to the requesting client 1150C. The client 1150C may receive the snapshot 1131 from the data store 1100 and store it as the initial version of a local copy 1165C using local storage resources 1160C. In one embodiment, the snapshot 1131 may be received by the client 1150B using the subscription management layer 1120.

In one embodiment, for a read-live subscription request, updates 1132 to the relevant file system subsection on the data store 1100 may be automatically provided to the subscribing client 1150C, i.e., without the client 1150C submitting additional requests for the updates. In one embodiment, for a read-live subscription request, the client 1150C may be notified when updates 1132 are available, and the client 1150C may then request the updates 1132 as appropriate. The client 1150C may apply the updates 1132 to the live copy 1165C stored locally to keep the copy current. Accordingly, when changes are made on the data store 1100 to the file system subsection to which the client 1150C has subscribed, the file system subsection updates 1132 may be pushed to the client 1150C using any suitable technique and with any suitable timing. For example, if multiple clients have a read-live subscription to a particular file system subsection, then updates may be sent to the subscribing clients as a batch at a single time. In one embodiment, for files divided into file chunks, only updated file chunks may be sent as part of an update. In one embodiment, the updates 1132 may be sent from the data store 1100 to the client 1150C using any suitable technique, e.g., a technique to express the updates as a delta of the current state of the relevant file system subsection and the previous state of the subsection. The subscription management layer 1120 may determine the difference(s) between the state of the file system subsection at a first time and the state of the same subsection at a later time (e.g., the time at which the update request is received). Any suitable technique may be used to determine the difference between the versions of the subsection at the two different points in time. As long as the read-live subscription is maintained by the subscription management layer 1120 and the client 1150C, different sets of updates 1132 may be provided to the client 1150C at various points in time to keep the local copy 1165C current.

Figure 9:
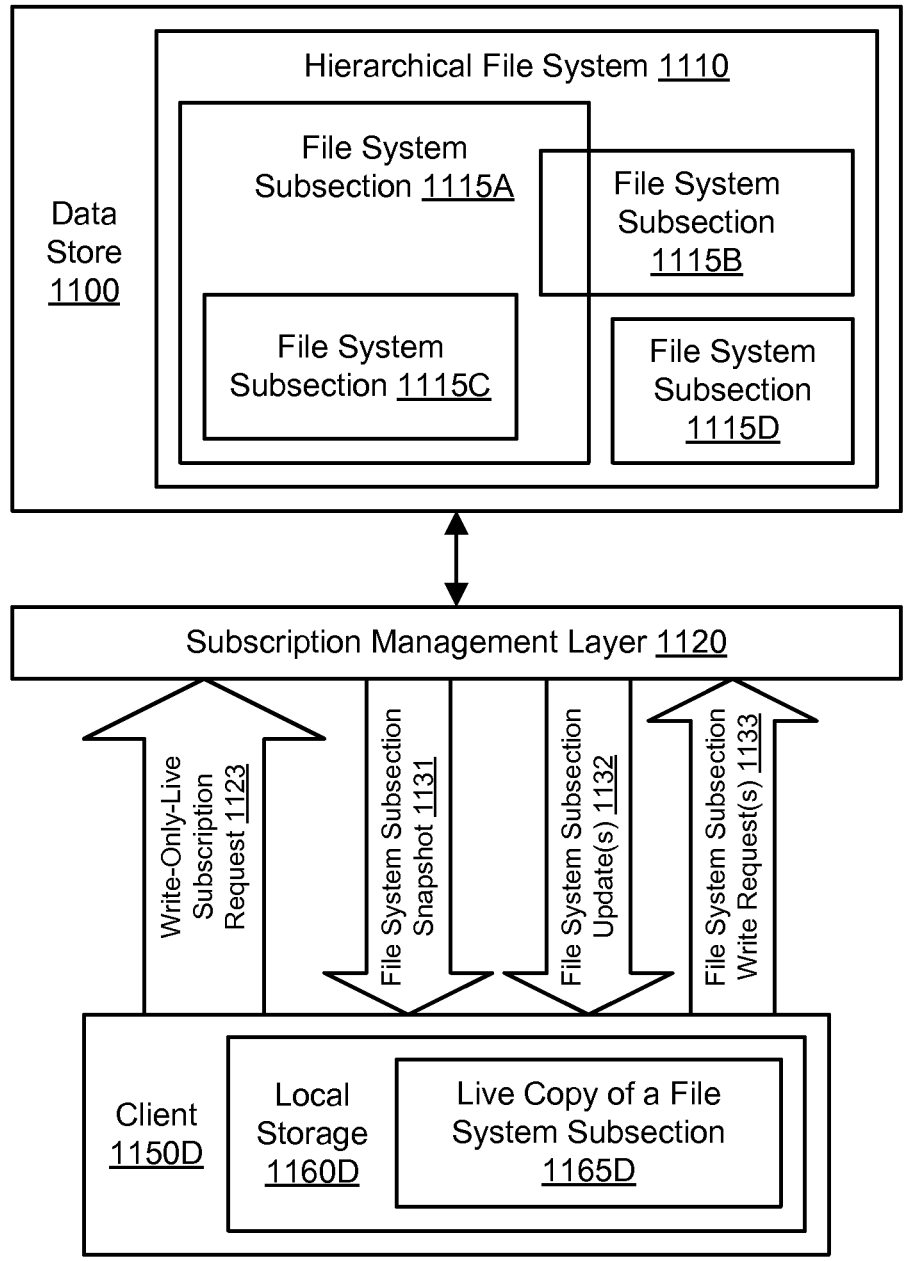
FIG. 9 illustrates an example system environment for a network-backed file system configured to fulfill a write-only-live subscription, according to one embodiment.

In one embodiment, the network-backed file system provided by the data store 1100 and subscription management layer 1120 may permit a client to have a write-only-live subscription to one or more subsections of the file system 1110. FIG. 9 illustrates an example system environment for a network-backed file system configured to fulfill a write-only-live subscription, according to one embodiment. A client 1150D may submit a write-only-live subscription request 1123 to the file system subscription management service. In one embodiment, the subscription request may be received and processed by the subscription management layer 1120, and any subscription data resulting from the processing of the subscription request may be maintained by the subscription management layer 1120. The write-only-live subscription request 1123, if approved, may permit the client 1150D to submit requests to update the contents of a file system subsection (such as subsection 1115A, 1115B, 1115C, or 1115D) on the data store 1100.

In one embodiment, fulfillment of the write-only-live subscription request 1123 may include providing the client 1150D with a live copy of the file system subsection to which the client 1150D has subscribed for write-only-live access. Accordingly, as discussed above with respect to FIG. 8, the data store 1100 may initially provide a snapshot 1131 of the file system subsection, and the data store 1100 may provide any updates 1132 to the file system subsection as they are entered on the data store 1100. The updates may be provided as the updated file chunks for the file system subsection that is specified in the subscription. The live copy 1165D of the file system subsection may be maintained by the client 1150D using local storage resources 1160D. However, it is contemplated the fulfillment of the write-only-live subscription request 1123 may not include providing the client 1150D with a copy of a file system subsection, in one embodiment.

For a write-only-live subscription request, the subscribing client 1150D may submit to the data store 1100 one or more write requests 1133 for a file system subsection. The write request(s) 1133 may be submitted using the subscription management layer 1120. Updates may be buffered at the client and flushed (as write requests) to the data store 1100 using any suitable flushing strategy. If a write request is entered at the data store 1100, then the contents of the relevant file system subsection are modified in the file system 1110 maintained on the data store 1100. A write request may include the contents that are sought to be modified in the relevant file system subsection: one or more modified directories, one or more new directories, one or more deletions of directories, one or more modified files, one or more new files, one or more deletions of files, one or more modified file chunks, one or more new file chunks, and/or one or more deletions of file chunks. In one embodiment, a write request may specify only the file chunks to be modified rather than also including unmodified chunks. In one embodiment, subscribers to the updated file system subsection may be notified of the changes or automatically provided with the changes.

In one embodiment, for a write-only-live subscription request, exclusive access of the client 1150D to the file system subsection is not guaranteed. Accordingly, multiple clients may have write-only-live subscriptions to the same file system subsection. If write requests from different clients for the same file system subsection are received within a window of time, then to avoid corrupting the file system subsection, the data store 1100 may use any suitable technique to determine which of the write requests, if any, to enter. The other write request(s) for the same file system subsection may be denied. A client whose write request has been denied may be informed of the denial and may resubmit the write request, e.g., after its local copy has been updated. In one embodiment, a write request may be denied if the request is out of date as a result of intervening changes to the relevant file system subsection. For example, a write request may be denied if it seeks to modify a directory, file, or file chunk that has already been deleted.

Figure 10:
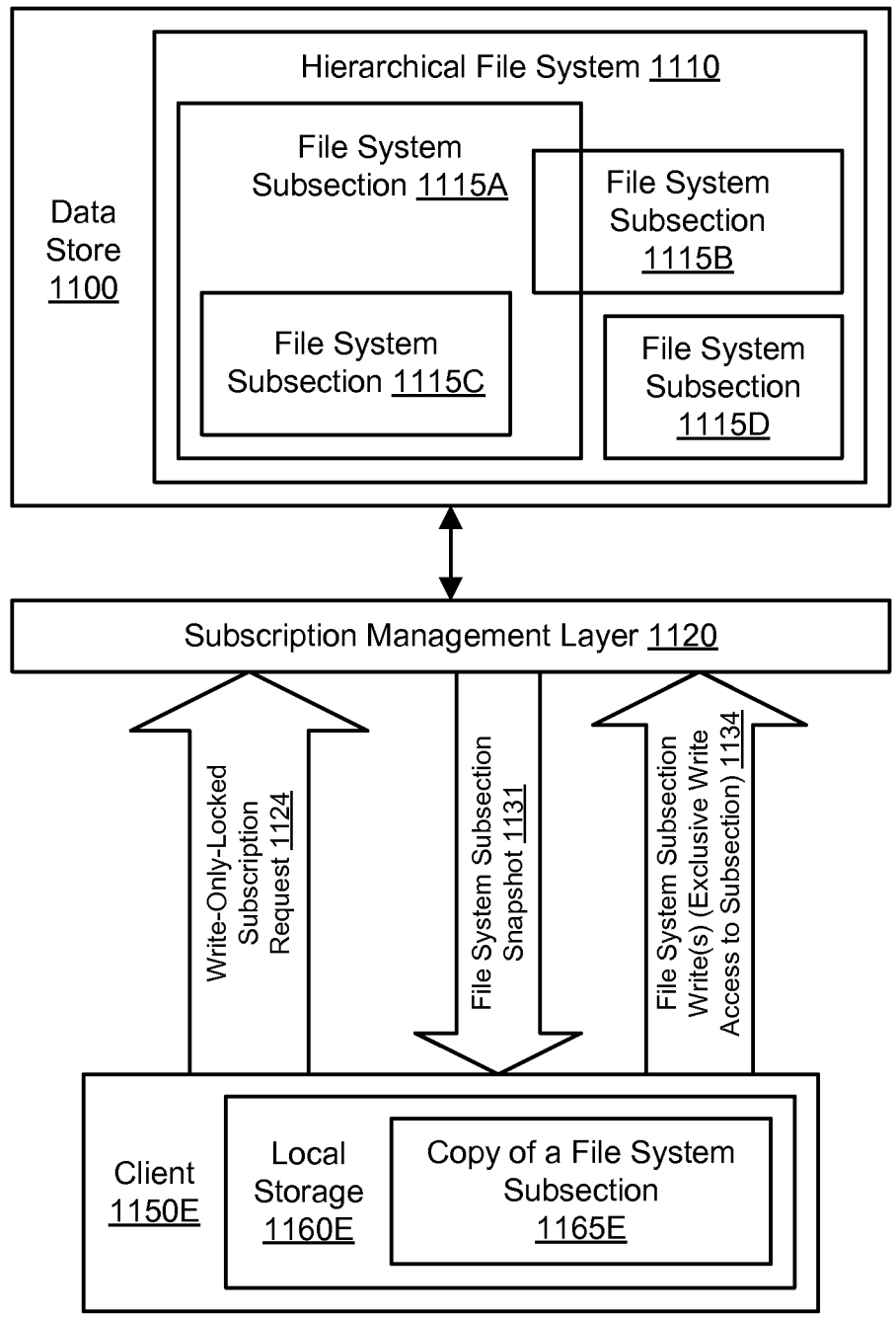
FIG. 10 illustrates an example system environment for a network-backed file system configured to fulfill a write-only-locked subscription, according to one embodiment.

In one embodiment, the network-backed file system provided by the data store 1100 and subscription management layer 1120 may permit a client to have a write-only-locked subscription to one or more subsections of the file system 1110. FIG. 10 illustrates an example system environment for a network-backed file system configured to fulfill a write-only-locked subscription, according to one embodiment. A client 1150E may submit a write-only-locked subscription request 1124 to the file system subscription management service. In one embodiment, the subscription request may be received and processed by the subscription management layer 1120, and any subscription data resulting from the processing of the subscription request may be maintained by the subscription management layer 1120. The write-only-locked subscription request 1124, if approved, may permit the client 1150E to submit requests to update the contents of a file system subsection (such as subsection 1115A, 1115B, 1115C, or 1115D) on the data store 1100. In one embodiment, a write-only-locked subscription may guarantee exclusive write access to a file system subsection on behalf of the subscribing client.

In one embodiment, fulfillment of the write-only-locked subscription request 1124 may include providing the client 1150E with an initial copy of the file system subsection to which the client 1150E has subscribed for write-only-locked access. Accordingly, as discussed above with respect to FIG. 7, the data store 1100 may initially provide a snapshot 1131 of the file system subsection. The copy 1165E of the file system subsection based on the snapshot 1131 may be maintained by the client 1150E using local storage resources

1160E. Because exclusive write access for the subscribing client 1150E may be guaranteed, updates may not be provided from the data store 1100 after the snapshot is generated. However, it is contemplated that the fulfillment of the write-only-locked subscription request 1124 may not include providing the client 1150E with a copy of a file system subsection, in one embodiment.

For a write-only-locked subscription request, the subscribing client 1150E may submit to the data store 1100 one or more write requests 1134 for a file system subsection. The write request(s) 1133 may be submitted using the subscription management layer 1120. Updates may be buffered at the client and flushed (as write requests) to the data store 1100 using any suitable flushing strategy. If a write request is entered, the contents of the relevant file system subsection are modified in the file system 1110 maintained on the data store 1100. A write request may include the contents that are sought to be modified in the relevant file system subsection: one or more modified directories, one or more new directories, one or more deletions of directories, one or more modified files, one or more new files, one or more deletions of files, one or more modified file chunks, one or more new file chunks, and/or one or more deletions of file chunks. If the client 1150E maintains a local copy 1165E, the client 1150E may also enter the changes against the local copy 1165E. In one embodiment, clients other than the subscribing client 1150E may be prevented from submitting write requests to the relevant file system subsection as long as the write-only-locked subscription for the client 1150E is maintained. In one embodiment, a write request may specify only the file chunks to be modified rather than also including unmodified chunks. In one embodiment, subscribers to the updated file system subsection may be notified of the changes or automatically provided with the changes.

In one embodiment, the network-backed file system may provide write-only-locked access to a particular file system subsection for only one client at a time. For example, if one client has a write-only-locked subscription to the file system subsection 1115D, then the subscription management layer 1120 may deny write subscriptions (e.g., write-only-locked subscriptions and write-only-live subscriptions) to the same subsection 1115D from other clients. As another example, if one client has a write-only-locked subscription to the file system subsection 1115C, then the subscription management layer 1120 may deny write subscriptions (e.g., write-only-locked subscriptions and write-only-live subscriptions) to the same subsection 1115C from other clients, including clients seeking write access to the overlapping or parent file system subsection 1115A.

In one embodiment, files may be divided into file chunks automatically for storage in the network-backed file system. The greater granularity provided by the use of file chunks may permit more efficient communication between the network-backed file system and the subscribers to the file system. For example, updates to file system subsections may be provided to clients by sending only those chunks that have been modified rather than entire files. In one embodiment, a file may be divided into chunks of equal size, such as by generating a new chunk after every 4096 bytes. In one embodiment, a file may be divided into chunks that vary in size. By attempting to follow boundaries of records when cutting files into file chunks, the integrity of individual records may tend to be maintained such that file chunks may tend to contain whole records rather than partial records.

Figure 11:
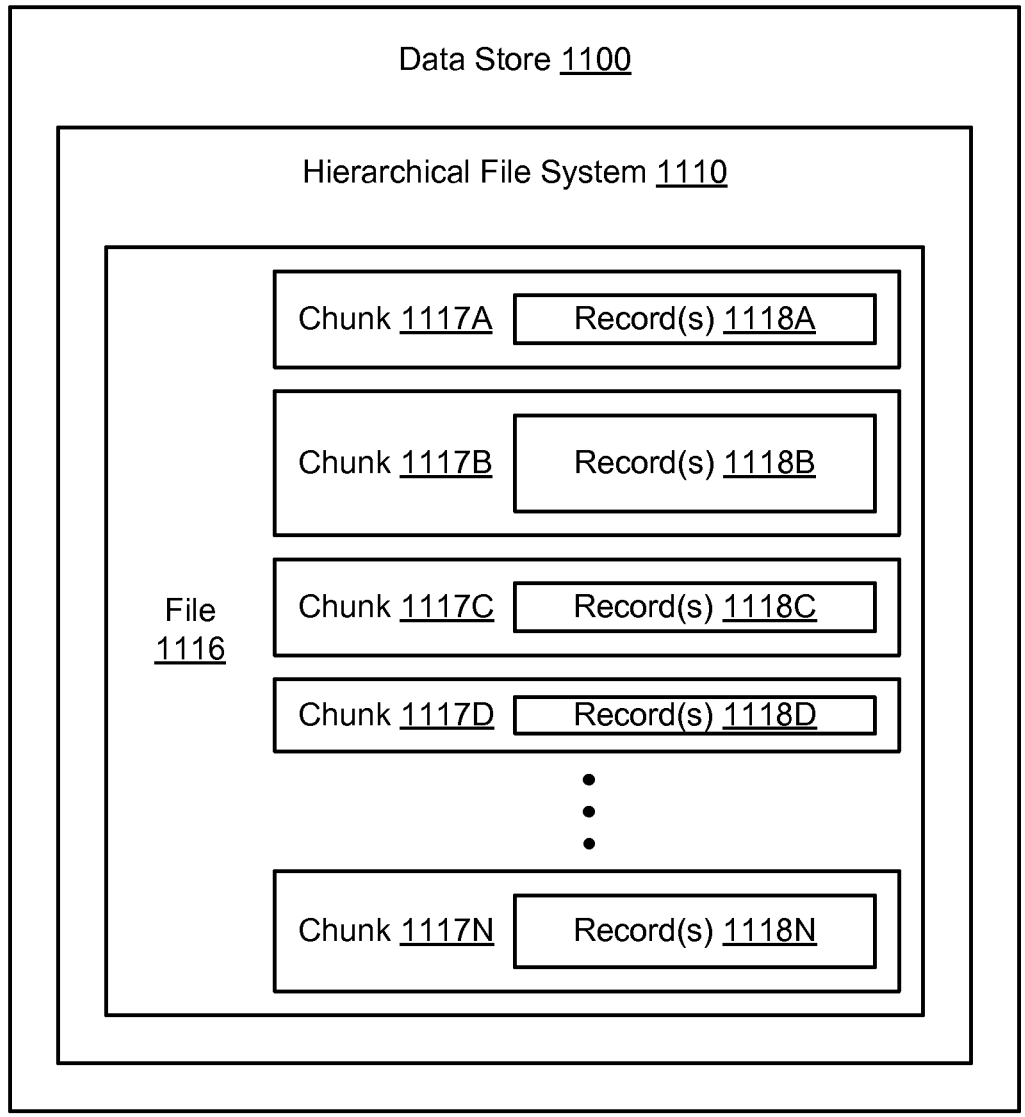
FIG. 11 illustrates an example of a file divided into file chunks of varying size in a network-backed file system, according to one embodiment.

FIG. 11 illustrates an example of a file divided into file chunks of varying size in a network-backed file system, according to one embodiment. As discussed above, the data store 1100 may store a hierarchical file system 1110 that includes a plurality of files organized using a hierarchy of directories. An example file 1116 is shown. When the file 1116 is added to the hierarchical file system 1110 (e.g., by a client subscribed with write access), the file 1116 may be divided into multiple file chunks. As shown in the example, the file 1116 may be divided into chunks 1117A, 1117B, 1117C, and 1117D through 1117N. However, it is contemplated that different numbers of chunks may be generated when dividing a file into chunks. In one embodiment, the file may be divided automatically by any suitable component of the file system subscription management service, including a component of the data store 1100, the subscription management layer 1120, or another component.

In various embodiments, the chunk-cutting techniques used to divide files into chunks may vary. In one embodiment, a chunk-cutting technique may be selected by the file system subscription management service automatically, e.g., based on a data type or content of the file. For example, the file system subscription management service may maintain chunk-cutting techniques for common data types. The data type of a file to be divided into chunks may be determined using any suitable file metadata and/or by inspection of the contents of the file; a matching chunk-cutting technique may then be selected based on the determined data type of the file. In one embodiment, a chunk-cutting technique may be selected and then presented to the client for confirmation or veto. In one embodiment, a custom chunk-cutting technique may be submitted by a client in association with an account (potentially including multiple client computer systems), with a particular subscription made under the account, or with a particular write request for a particular file.

In one embodiment, a chunk-cutting technique may generate individual chunks that contain whole records rather than partial records. As used herein, the term "record" may include a line of text in a line-of-text-based file (e.g., a .txt log file or a .csv file containing lines of text with comma-separated values), a complex or structured record in a list-of-records-based file (e.g., a .xml file or a .json file), a frame of video, or any other suitable unit of data. The boundaries of such records may be observed when cutting the file 1116 into the chunks 1117A, 1117B, 1117C, and 1117D through 1117N. For example, a new chunk in a line-of-text-based file may be generated on the first new line after a predetermined amount of bytes (e.g., 8 MB or any other suitable size) have been encountered. As another example, a new chunk in list-of-records-based file may be generated on the first new record after a predetermined amount of bytes (e.g., 8 MB or any other suitable size) have been encountered. For a file containing digital video, chunks may be generated to preserve the metadata structure before and after a frame of video. Additionally, a client may submit a unique string representing an end-of-line marker for a less common file type. Accordingly, as shown in the example of FIG. 11, chunk 1117A may contain one or more whole records 1118A, chunk 1117B may contain one or more whole records 1118B, chunk 1117C may contain one or more whole records 1118C, chunk 1117D may contain one or more whole records 1118D, and chunk 1117N may contain one or more whole records 1118N. Different ones of the chunks within the file 1116 may tend to vary in size if the individual records tend to vary in size. In one embodiment, chunks may be limited to a maximum size, and some chunks at the maximum size may contain partial records, e.g., at the beginning and/or end of the chunk. Accordingly, the chunk-cutting techniques described herein may attempt to preserve whole records within chunks but may not always produce such chunks.

Figure 12:
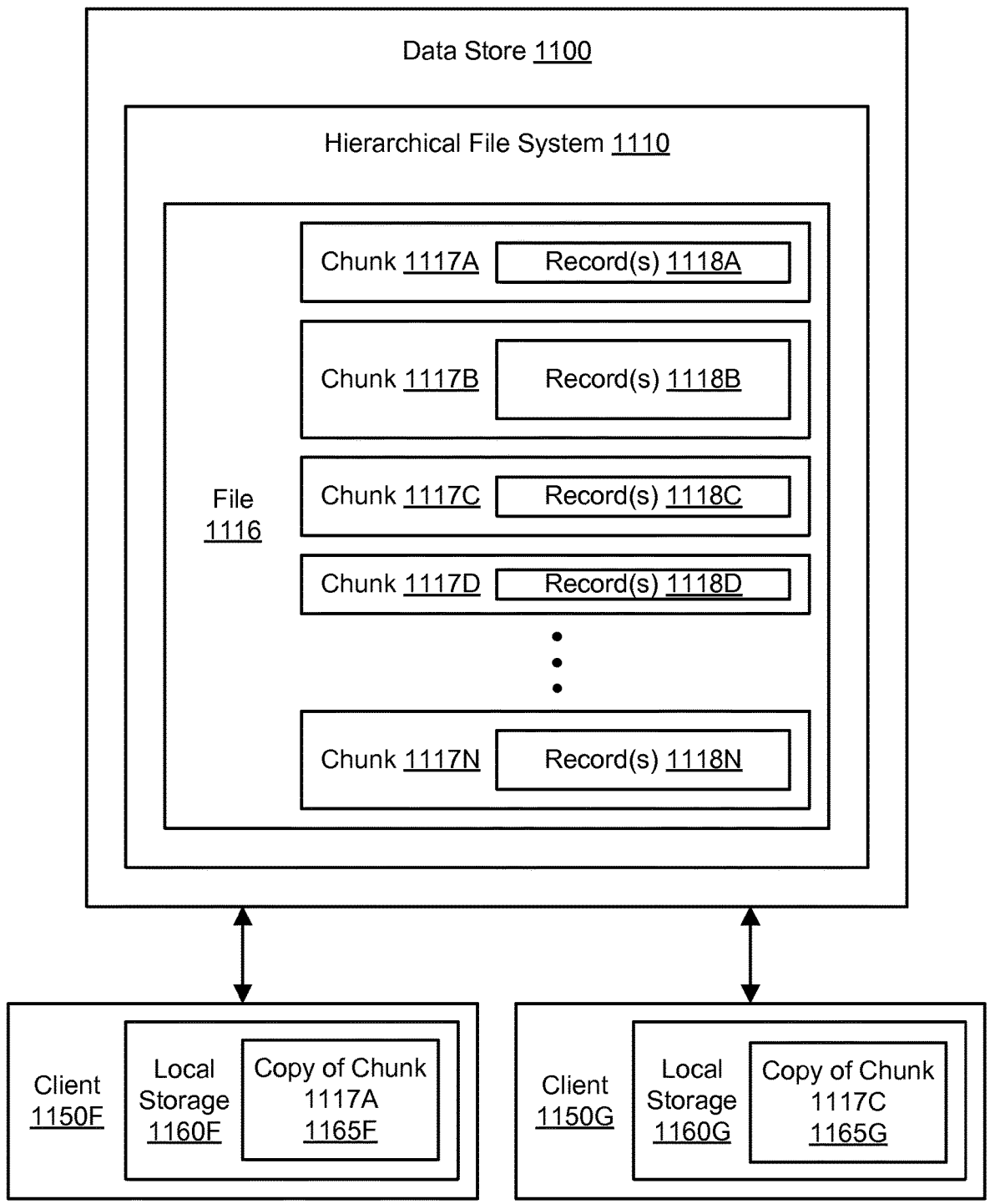
FIG. 12 illustrates an example of different clients subscribing to file chunks from the same file in a network-backed file system, according to one embodiment.

FIG. 12 illustrates an example of different clients subscribing to chunks from the same file in a network-backed file system, according to one embodiment. By dividing a file 1116 into multiple chunks that tend to contain whole records rather than partial records, different chunks within the same file 1116 may be processed by different clients. As shown in the example of FIG. 12, one client 1150F may store a local copy 1165F of a particular chunk, such as chunk 1117A, in the client's local storage 1160F. Furthermore, another client 1150G may store a local copy 1165G of a different chunk, such as chunk 1117C, in the client's local storage 1160G. The copies of the file chunks may be obtained using a suitable subscription request or other request, including a read-live subscription request or a read-only snapshot request for one or more specific chunks of the file 1116. Because the file 1116 has been divided into chunks that each contain whole records, the two clients 1150F and 1150G may perform operations on different portions of the file without needing to obtain copies of multiple file chunks in order to reconstruct partial records on chunk boundaries. Similarly, multiple clients may update multiple chunks within the same file 1116 using a write-only-live subscription in which exclusive write access to the file 1116 is not guaranteed.

In one embodiment, a chunk may be permitted to grow to a certain predetermined size until the chunk is split into two chunks. The maximum chunk size may be configurable per account, per client, or per file type. Similarly, a chunk may be permitted to shrink to a certain predetermined size until the chunk is merged into another chunk (e.g., a neighboring chunk). The minimum chunk size may be configurable per account, per client, or per file type. As discussed below, the new chunk(s) resulting from a split or a merge may have index identifiers that are based on the index identifier of the old chunk(s).

In one embodiment, each file chunk may be identifiable by an index number. A radix tree or other suitable data structure may be used to maintain an index of the chunks in a file. Using a radix tree, indexes for chunks may vary in length, and the length of an index (in digits or characters) may generally indicate its depth in the tree. When a large chunk is divided into two new chunks, or when a chunk is added between two existing chunks, nodes may be added to a lower level of the radix tree; the newly added nodes may represent indexes that are one or more digits or characters longer than the nodes at the next highest level of the tree. In this manner, indexes of existing chunks may be preserved when new chunks are added. The index of a child node may be longer than the index of its parent node and may include the index of its parent node as a prefix. In one embodiment, a client that subscribes to a parent chunk may be automatically subscribed to newly generated child chunks whose indexes include the index of the parent chunk as a prefix. For example, a read-live subscription may provide read access to a specific file and a specific chunk '1A2' of that file. If the chunk '1A2' is split into two new chunks '1A21' and '1A22,' then the original subscription may automatically provide the same level of read access to the two new chunks based on the relationship between the new index identifiers and the parent index identifier (e.g., as expressed in a radix tree). Similarly, if chunk '1A21' shrinks and is merged into neighboring chunk '1A22' to create a new chunk '1A2,' then a subscriber to '1A21' may automatically be granted access to the new chunk '1A2' based on the index relationship.

Figure 13:
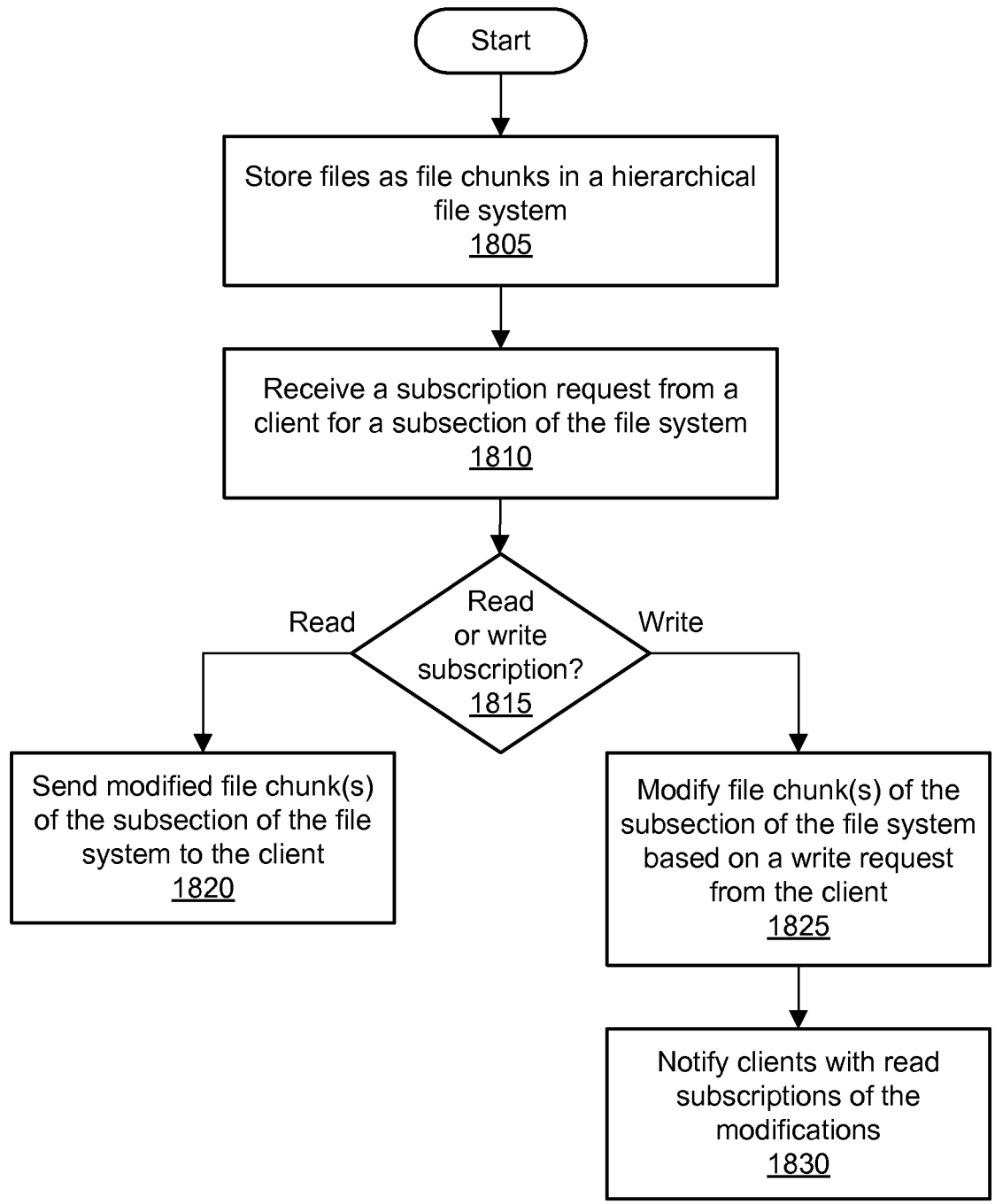
FIG. 13 is a flowchart illustrating a method for managing a network-backed file system, according to one embodiment.

FIG. 13 is a flowchart illustrating a method for managing a network-backed file system, according to one embodiment. As shown in 1805, files may be stored in a hierarchical file system. The file system may be maintained as a network-backed file system by a data store that manages storage resources. The data store may be coupled to one or more clients over a network. Each of the files may be stored as one or more file chunks. In one embodiment, files added to the file system may be divided into file chunks automatically (as discussed above with respect to FIGS. 6 and 7).

As shown in 1810, a subscription request may be received from a client for a particular subsection of the file system. In various embodiments, the subscription request may be a read subscription request, a write subscription request, or a combination or variation thereof. The subscription request may specifically name or specify criteria for one or more directories (including their contents, including subdirectories and their contents), one or more files, and/or one or more chunks within files. The subscription request may also specify a window of time before the subscription expires.

As shown in 1815, to fulfill the subscription, it may be determined what type of access is sought by the subscription, such as read access or write access. As shown in 1820, for a read subscription, the subscription may be fulfilled by sending a copy of the contents of the subsection of the file system from the data store to the subscribing client. The client may store the local copy using local storage resources. The read subscription may be fulfilled based on the specific type of read subscription or other request, including as a read-only snapshot (as discussed with respect to FIG. 7) or a read-live subscription (as discussed with respect to FIG. 8) for which live updates may be provided. In one embodiment, the operation shown in 1820 may include sending only the modified chunks of a file system subsection as part of an update for a read subscription.

As shown in 1825, for a write subscription, the subscription may be fulfilled by the data store modifying contents of the subsection of the file system based on a write request submitted by the subscribing client. The write subscription may be fulfilled based on the specific type of write subscription, such as a write-only-live subscription (as discussed with respect to FIG. 9) or a write-only-locked subscription (as discussed with respect to FIG. 10) that guarantees exclusive write access. In one embodiment, the operation shown in 1825 may include the data store receiving a write request that includes only the modified file chunks of a file system subsection. As shown in 1830, clients with read subscriptions may be notified of the modifications entered in 1825. The clients may request to receive the modifications (e.g., the updated file chunks) or may automatically receive the modifications (as discussed above with respect to FIG. 8).

Network-Based Services

In one embodiment, the network-backed file system may be provided to clients by a network-based service (e.g., a web-based service), e.g., a file system subscription management service. The network-based service may host a plurality of network-backed file systems. In some embodiments, a resource management system may manage dynamic pricing, reservation, and allocation of network-based resources such as a network-backed file system. Networks set up by an entity such as a company or a public sector organization to provide one or more services (such as various types of network-accessible computing or storage) accessible via the Internet and/or other networks to a distributed set of clients may be termed provider networks. A provider network may include numerous data centers hosting various resource pools, such as collections of physical and/or virtualized computer servers, storage devices, networking equipment and the like, that are used to implement and distribute the infrastructure and services offered by the provider. The compute resources may, in some embodiments, be offered to clients in units called "instances," such as virtual or physical compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

In some embodiments, operators of provider networks may implement a flexible set of resource reservation, control, and access interfaces for their clients. For example, a resource manager of the provider network may implement a programmatic resource reservation interface (e.g., via a web site or a set of web pages) that allows clients to learn about, select, purchase access to, and/or reserve compute instances and subscribe to network-backed file systems. Such an interface may include capabilities to allow browsing of a resource catalog and provide details and specifications of the different types or sizes of resources supported, the different reservation types or modes supported, pricing models, and so on. The provider network may support several different purchasing modes (which may also be referred to herein as reservation modes) in one embodiment: for example, long-term reservations, on-demand resource allocation, or spot-price-based resource allocation. Using the long-term reservation mode, a client may make a low, one-time, upfront payment for a resource instance, reserve it for a specified duration such as a one-year or three-year term, and pay a low hourly rate for the instance; the client would be assured of having the reserved instance available for the term of the reservation. Using on-demand mode, a client could pay for capacity by the hour (or some appropriate time unit), without any long-term commitments or upfront payments. In the spot-price mode, a client could specify the maximum price per unit time that it is willing to pay for a particular type of resource, and if the client's maximum price exceeded a dynamic spot price determined at least in part by supply and demand, that type of resource would be provided to the client. In some embodiments, dynamically resizable pools of resource instances may be set aside for the different reservation types or modes: e.g., long-term reserved instances may be allocated from one pool, on-demand instances from another, and so on. During periods when the supply of the requested resource type exceeds the demand, the spot price may become significantly lower than the price for on-demand mode. In some implementations, if the spot price increases beyond the maximum bid specified by a client, a resource allocation may be interrupted: i.e., a resource instance that was previously allocated to the client may be reclaimed by the resource manager and may be allocated to some other client that is willing to pay a higher price. Other purchasing modes or combinations of modes may be implemented by the resource manager in some embodiments.

Illustrative Computer System

In at least some embodiments, a computer system that implements a portion or all of one or more of the technologies described herein may include a general-purpose computer system that includes or is configured to access one or more computer-readable media. FIG. 14 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 14 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a network-aware caching system, wherein the one or more computing devices include a client computing device, and wherein the network-aware caching system is configured to:
determine performance characteristics comprising respective access characteristics of a plurality of storage locations as measured by the client computing device, wherein the plurality of storage locations comprise one or more dedicated storage locations of the client computing device and one or more shared network-access storage locations accessible to the client computing device over a network;
receive, from the client computing device, a request to access data wherein the requested access comprises read access, write access, or read/write access, and wherein the data is currently stored at one of the plurality of storage locations;
in response to the request or a user access pattern including the request, determine whether to cache the data based at least in part on differences between respective ones of the performance characteristics, and in response to a determination to cache the data:
select one of the plurality of storage locations for caching the data, wherein the selected storage location is determined based at least in part on the performance characteristics;
cache the data in the selected storage location, wherein to cache the data in the selected storage location the network-aware caching system is configured to:
copy the data to the selected storage location; and
maintain a copy of the data at the selected storage location such that updates to the data by a computing device other than the client computing device are reflected in the copy of the data at the selected storage location; and
implement the read access, write access, or read/write access based on the cached data.

2. The system as recited in claim 1, wherein the network-aware caching system is configured to:
select an additional one of the plurality of storage locations for storing an additional chunk of data to which access is requested by the client computing device, wherein the selected additional storage location is determined based on the performance characteristics and the one or more user access patterns, wherein the selected storage location and the selected additional storage location comprise one of the dedicated storage locations and one of the shared network-access storage locations.

3. The system as recited in claim 1, wherein the network-aware caching system is configured to:
update the performance characteristics based on performance metrics collected for the plurality of storage locations.

4. The system as recited in claim 1, wherein the requested access comprises read access, wherein the selected storage location comprises one of the dedicated storage locations, and wherein the selected storage location is determined by a caching layer on the client computing device.

5. A computer-implemented method, comprising:
determining performance characteristics comprising respective access characteristics of a plurality of storage locations as measured by a client computing device, wherein the plurality of storage locations comprise one or more dedicated storage locations managed by the client computing device and one or more shared network-access storage locations accessible to the client computing device over a network;
determining whether to cache data to which access is requested by the client computing device based at least in part on differences between respective ones of the performance characteristics, wherein the data is currently stored at one of the plurality of storage locations, and in response to a determination to cache the data:

selecting one of the plurality of storage locations for caching the data, wherein the selected storage location is determined based at least in part on the performance characteristics; and caching the data in the selected storage location, comprising:

copying the data to the selected storage location; and maintaining the copy of the data at the selected storage location such that updates to the data by a computing device other than the client computing device are reflected in the copy of the data at the selected storage location.

6. The computer-implemented method as recited in claim 5, further comprising:

selecting an additional one of the plurality of storage locations for storing additional data to which access is requested by the client computing device, wherein the selected additional storage location is determined based on the performance characteristics, wherein the selected storage location and the selected additional storage location comprise one of a plurality of dedicated storage locations for the client computing device and one of the shared network-access storage locations.

7. The computer-implemented method as recited in claim 5, further comprising:

updating the performance characteristics based on performance metrics collected for the plurality of storage locations.

8. The computer-implemented method as recited in claim 5, wherein the selected storage location is determined to provide a selected level of latency, throughput, reliability, or a combination thereof.

9. The computer-implemented method as recited in claim 5, wherein the performance characteristics further comprise storage costs, and wherein the method further comprises:

receiving, from a user, an indicator of a storage budget for the client computing device, wherein the selected storage location is determined to provide a selected storage cost, based on the storage budget.

10. The computer-implemented method as recited in claim 5, wherein the performance characteristics further comprise durability metrics, and wherein the method further comprises:

receiving, from a user, an indicator of an importance of the data, wherein the selected storage location is determined to provide a selected level of durability of the data, based on the importance of the data.

11. The computer-implemented method as recited in claim 5, wherein the performance characteristics further comprise reliability metrics, and wherein the method further comprises:

receiving, from a user, an indicator of a sensitivity of the data, wherein the selected storage location is determined to provide a selected level of security of the data, based on the sensitivity of the data.

12. The computer-implemented method as recited in claim 5, wherein the data is stored in the selected storage location using a caching layer, and wherein the caching layer emulates a local disk or local memory to an operating system of the client computing device.

13. The computer-implemented method as recited in claim 5, wherein the selected storage location is determined by a caching service external to the client computing device.

14. The computer-implemented method as recited in claim 5, wherein the selected storage location is determined by a caching layer resident on the client computing device.

15. A non-transitory computer-readable storage medium storing program instructions computer-executable to perform:

determining performance characteristics comprising respective access characteristics of a plurality of storage locations as measured by a client computing device, wherein the plurality of storage devices comprise one or more dedicated storage devices managed by the client computing device and one or more shared storage devices accessible to the client computing device over a network;

determining whether to cache data to which access is requested by the client computing device based at least in part on differences between respective ones of the performance characteristics, wherein the data is currently stored at one of the plurality of storage locations, and in response to a determination to cache the data:

selecting one of the plurality of storage locations for caching the data, wherein the selected storage location is determined based at least in part on the performance characteristics; and causing the data to be cached on the selected storage device, comprising:

causing the data to be copied to the selected storage location; and causing the copy of the data to be maintained at the selected storage location such that updates to the data by a computing device other than the client computing device are reflected in the copy of the data at the selected storage location.

16. The non-transitory computer-readable storage medium as recited in claim 15, wherein the program instructions are further computer-executable to perform:

updating the performance characteristics based on performance metrics collected for the plurality of storage devices.

17. The non-transitory computer-readable storage medium as recited in claim 15, wherein the selected storage device is determined to provide a selected level of latency, throughput, reliability, or a combination thereof.

18. The non-transitory computer-readable storage medium as recited in claim 15, wherein the performance characteristics further comprise storage costs, and wherein the program instructions are further computer-executable to perform:

receiving, from a user, an indicator of a storage budget for the client computing device, wherein the selected storage device is determined to provide a selected storage cost, based on the storage budget.

19. The non-transitory computer-readable storage medium as recited in claim 15, wherein the performance characteristics further comprise durability metrics, and wherein the program instructions are further computer-executable to perform:

receiving, from a user, an indicator of an importance of the data, wherein the selected storage device is determined to provide a selected level of durability of the data, based on the importance of the data.

20. The non-transitory computer-readable storage medium as recited in claim 15, wherein the performance characteristics further comprise reliability metrics, and wherein the program instructions are further computer-executable to perform:

receiving, from a user, an indicator of a sensitivity of the data, wherein the selected storage device is determined to provide a selected level of security of the data, based on the sensitivity of the data.

\* \* \* \* \*